(12) United States Patent
Bae et al.

(10) Patent No.: US 10,880,588 B2
(45) Date of Patent: Dec. 29, 2020

(54) APPARATUS AND METHOD FOR TRANSMITTING/RECEIVING INFORMATION REGARDING MEDIA CONTENT IN MULTIMEDIA SYSTEM

(71) Applicant: Samsung Electronics Co., Ltd., Suwon-si (KR)

(72) Inventors: Jae-Hyeon Bae, Seoul (KR); Dong-Yeon Kim, Seoul (KR); Young-Wan So, Gunpo-si (KR); Hyun-Koo Yang, Seoul (KR); Kyung-Mo Park, Seoul (KR); Hyeon-Cheol Pu, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/306,347

(22) PCT Filed: May 30, 2017

(86) PCT No.: PCT/KR2017/005640
§ 371 (c)(1),
(2) Date: Nov. 30, 2018

(87) PCT Pub. No.: WO2017/209490
PCT Pub. Date: Dec. 7, 2017

(65) Prior Publication Data
US 2019/0327498 A1    Oct. 24, 2019

(30) Foreign Application Priority Data
May 30, 2016 (KR) .................. 10-2016-0066825

(51) Int. Cl.
*H04N 21/235* (2011.01)
*H04N 21/236* (2011.01)
(Continued)

(52) U.S. Cl.
CPC ......... *H04N 21/235* (2013.01); *H04N 21/237* (2013.01); *H04N 21/2362* (2013.01);
(Continued)

(58) Field of Classification Search
CPC .............. H04N 21/235; H04N 21/437; H04N 21/25841; H04N 21/237; H04N 21/2362;
(Continued)

(56) References Cited

U.S. PATENT DOCUMENTS

2006/0147083 A1* 7/2006 Piersol .................... G06F 21/16
382/100
2013/0097627 A1 4/2013 Hwang et al.
(Continued)

FOREIGN PATENT DOCUMENTS

KR    10-2006-0030715 A    4/2006
KR    10-2007-0018472 A    2/2007
(Continued)

*Primary Examiner* — Michael A Keller
(74) *Attorney, Agent, or Firm* — Jefferson IP Law, LLP

(57) ABSTRACT

The present invention provides a method for a transmission apparatus in a multimedia system. The method comprises a step of transmitting a message including a priority order of media source location information, and three or more pieces of media source location information, wherein the three or more pieces of media source location information include primary media source location information, alternative media source location information and original media source location information.

14 Claims, 8 Drawing Sheets

(51) Int. Cl.
    *H04N 21/2362* (2011.01)
    *H04N 21/237* (2011.01)
    *H04N 21/258* (2011.01)
    *H04N 21/437* (2011.01)

(52) U.S. Cl.
    CPC . *H04N 21/23605* (2013.01); *H04N 21/25841* (2013.01); *H04N 21/437* (2013.01)

(58) Field of Classification Search
    CPC ............ H04N 21/23605; H04N 21/83; H04N 21/23116; H04N 21/23103; H04L 29/08; H04L 67/1002
    See application file for complete search history.

(56) References Cited

U.S. PATENT DOCUMENTS

| | | | |
|---|---|---|---|
| 2014/0282776 A1* | 9/2014 | De Vriendt | H04N 21/2385 725/109 |
| 2015/0128174 A1* | 5/2015 | Rango | H04N 21/21805 725/34 |
| 2016/0173387 A1* | 6/2016 | Chandrayana | H04L 67/28 370/231 |
| 2017/0171041 A1* | 6/2017 | Knowler | H04L 43/045 |

FOREIGN PATENT DOCUMENTS

| | | |
|---|---|---|
| KR | 10-2013-0005194 A | 1/2013 |
| KR | 10-2013-0089709 A | 8/2013 |
| KR | 10-2015-0035565 A | 4/2015 |
| WO | 2012/157928 A2 | 11/2012 |

\* cited by examiner

US 10,880,588 B2

APPARATUS AND METHOD FOR TRANSMITTING/RECEIVING INFORMATION REGARDING MEDIA CONTENT IN MULTIMEDIA SYSTEM

CROSS-REFERENCE TO RELATED APPLICATION(S)

This application is a U.S. National Stage application under 35 U.S.C. § 371 of an International application filed on May 30, 2017 and assigned application number PCT/KR2017/005640, which claimed the benefit of a Korean patent application filed on May 30, 2016 in the Korean Intellectual Property Office and assigned Serial number 10-2016-0066825, the entire disclosure of which is hereby incorporated by reference.

TECHNICAL FIELD

The present disclosure relates to an apparatus and method for transmitting/receiving a signal in a multimedia system, and more particularly to an apparatus and method for transmitting/receiving information related to media contents in a multimedia system.

BACKGROUND

Taking into account the explosive growth of wired and wireless internet, various types of internet televisions (TVs) will become a meaningful part of everyday life in the future. It is expected that about 80% of mobile data traffic will come from smart phones, and mobile video traffic will account for about 60% of total mobile data traffic by 2020 according to rapid increase in mobile data traffic.

For example, if a sports match such as a World Cup game is played at specific time, during that time users may gather on a high-definition live broadcasting service provided by a portal site. In this case, the amount of mobile data traffic will explosively increase, so it may be difficult to smoothly watch the match through a user terminal, e.g., a smart phone.

Specifically, as demand for a real-time live broadcasting service through a mobile terminal increases, a service provider, e.g., a mobile communication provider, needs a scheme which may both develop a supplementary service which corresponds to an increase in demand for the real-time live broadcasting service and effectively manage mobile traffic.

Meanwhile, in a streaming scheme based on an existing hypertext transfer protocol (HTTP) scheme, media resource identification information is included in meta data when media contents are generated. For example, in a case in which media contents are converted into an HTTP scheme-based file form for streaming 10 minutes of media contents through the internet, information of a media contents server from which the 10 minutes of media contents may be received is included in meta data in the form of a uniform resource locator (URL) and/or the like, and the meta data of the information of the media contents server is transmitted to a receiving apparatus.

Therefore, the receiving apparatus requests to transmit a streaming service which the receiving apparatus wants from a HTTP scheme-based media contents server based on media resource identification information, e.g., the URL and/or the like, included in the meta data after receiving the meta data.

In a contents delivery network (CDN) environment, when one receiving apparatus, e.g., one user terminal, and one transmitting apparatus initiate a session through one network and one media contents server according to the location and environment of the user terminal and network situation of the service provider, and in which a media contents service is provided through the session, a case in which a seamless media contents service needs to be provided by changing the media contents server or the session according to the needs of the receiving apparatus or the transmitting apparatus may occur.

In an HTTP scheme as an existing scheme, media resource identification information, which corresponds to media contents, is included in meta data when the media contents are generated, and this scheme may cause many issues when dynamic media resource identification information is used in an actual real-time streaming environment.

First, media resource identification information, e.g., URL information, used in an existing HTTP scheme does not use an actual address, e.g., an internet protocol (IP) address and/or the like, of a media contents server, so it needs to detect the actual address of the media contents server through a domain name server (DNS) and/or the like, to access the media contents server, and delay due to detecting the address of the media contents server occurs.

The address of a corresponding media contents server is included in meta data for a set duration, e.g., a set file duration when the corresponding media contents are generated, and it is impossible to update media resource identification information in real time according to a dynamic channel change. This makes it difficult to dynamically change the channel and the media contents server with one program while a corresponding media contents streaming service is being used.

Further, in an existing HTTP scheme-based streaming service, it is impossible to continuously use the media contents service which is currently being used when the address of a media contents server is changed while the media contents service is being provided. So, a case occurs in which a receiving apparatus needs to use the media contents service through the media contents server after performing an initial access procedure with the media contents server again in order to once again receive the address of the media contents server.

Media resource identification information is included in meta data when media contents are generated in a media contents service environment that uses an existing CDN. So, in a real-time media contents streaming environment of an existing CDN environment, a case may occur in which it is difficult to dynamically provide media contents according to the changed media contents server or session if the media contents server or session is changed according to the needs of a receiving apparatus or transmitting apparatus.

This will be described with reference to FIG. 1.

FIG. 1 illustrates an inner structure of a general multimedia system.

Referring to FIG. 1, it will be assumed that a receiving apparatus, e.g., a user terminal, accesses a media contents server located at area 3. The user terminal may use a media contents service by receiving media contents from the media contents server located at area 3.

However, if it is impossible for the media contents server located at area 3 or a designated network to provide the media contents service while the user terminal uses the media contents service, the user terminal may no longer use the media contents service.

If the address of the media contents server located at area 3 is changed while the user terminal uses the media contents service, it is impossible for the user terminal to continuously use the media contents service currently being used.

If there is a need to change the media contents server or session according to in the needs of the user terminal while the user terminal uses the media contents service, it is impossible for the user terminal to continuously use the media contents service currently being used.

The above information is presented as background information only to assist with an understanding of the present disclosure. No determination has been made, and no assertion is made, as to whether any of the above might be applicable as prior art with regard to the present disclosure.

SUMMARY

An embodiment of the present disclosure proposes an apparatus and method for transmitting/receiving information related to media contents in a multimedia system.

An embodiment of the present disclosure proposes an apparatus and method for managing a media resource based on the situation of a media contents service in a multimedia system.

An embodiment of the present disclosure proposes an apparatus and method for dynamically transmitting/receiving media resource identification information and media signaling information in a multimedia system.

An embodiment of the present disclosure proposes an apparatus and method for dynamically providing media resource identification information based on the number of user terminals to which a media contents service is provided, use environments of the user terminals, locations of the user terminals, and/or the like in an existing static media resource-allocation environment by using a media contents streaming service that is based on a moving picture experts group (MPEG) media transport (MMT) scheme.

An embodiment of the present disclosure proposes an apparatus and method for providing effective media resource management by providing media resource identification information and media signaling information according to the situation of a media contents service, for example, the number of user terminals to which a media contents service is provided, and/or the like when a real-time media contents service is provided in a multimedia system.

According to an embodiment of the present disclosure, a method of a transmitting apparatus in a multimedia system is proposed, and the method comprises transmitting a message including the priority of media source location information and at least three pieces of media source location information, wherein the at least three pieces of media source location information include primary media source location information, alternative media source location information, and origin media source location information.

According to an embodiment of the present disclosure, a method of a transmitting apparatus in a multimedia system is proposed, and the method comprises transmitting a message including the priority of signaling location information and at least three pieces of signaling location information, wherein the at least three pieces of signaling location information include primary signaling location information, alternative signaling location information, and origin signaling location information.

According to an embodiment of the present disclosure, a method of a receiving apparatus in a multimedia system is proposed, and the method comprises receiving a message including the priority of media source location information and at least three pieces of media source location information, wherein the at least three pieces of media source location information include primary media source location information, alternative media source location information, and origin media source location information.

According to an embodiment of the present disclosure, a method of a receiving apparatus in a multimedia system is proposed, and the method comprises receiving a message including the priority of signaling location information and at least three pieces of signaling location information, wherein the at least three pieces of signaling location information include primary signaling location information, alternative signaling location information, and origin signaling location information.

According to an embodiment of the present disclosure, a transmitting apparatus in a multimedia system is proposed, and the transmitting apparatus comprises a transmitter configured to transmit a message including the priority of media source location information and at least three pieces of media source location information, wherein the at least three pieces of media source location information include primary media source location information, alternative media source location information, and origin media source location information.

According to an embodiment of the present disclosure, a transmitting apparatus in a multimedia system is proposed, and the transmitting apparatus comprises a transmitter configured to transmit a message including the priority of signaling location information and at least three pieces of signaling location information, wherein the at least three pieces of signaling location information include primary signaling location information, alternative signaling location information, and origin signaling location information.

According to an embodiment of the present disclosure, a receiving apparatus in a multimedia system is proposed, and the receiving apparatus comprises a receiver configured to receive a message including the priority of media source location information and at least three pieces of media source location information, wherein the at least three pieces of media source location information include primary media source location information, alternative media source location information, and origin media source location information.

According to an embodiment of the present disclosure, a receiving apparatus in a multimedia system is proposed, and the receiving apparatus comprises a receiver configured to receive a message including the priority of signaling location information and at least three pieces of signaling location information, wherein the at least three pieces of signaling location information include primary signaling location information, alternative signaling location information, and origin signaling location information.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

Effect of the Invention

An embodiment of the present disclosure enables the transmission/reception of information related to media contents in a multimedia system.

An embodiment of the present disclosure enables the management of a media resource based on the situation of a media contents service in a multimedia system.

An embodiment of the present disclosure enables the dynamic transmission/reception of media resource identification information and media signaling information in a multimedia system.

An embodiment of the present disclosure enables to dynamically provide media resource identification information based on the number of user terminals to which a media contents service is provided, use environments of the user terminals, locations of the user terminals, and/or the like in an existing static media resource-allocation environment using a media contents streaming service that is based on an MMT scheme.

An embodiment of the present disclosure enables to provide effective media resource management by providing media resource identification information and media signaling information according to the situation of a media contents service, for example, the number of user terminals to which a media contents service is provided, and/or the like when a real-time media contents service is provided in a multimedia system.

BRIEF DESCRIPTION OF THE DRAWINGS

The above and other aspects, features and advantages of certain exemplary embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
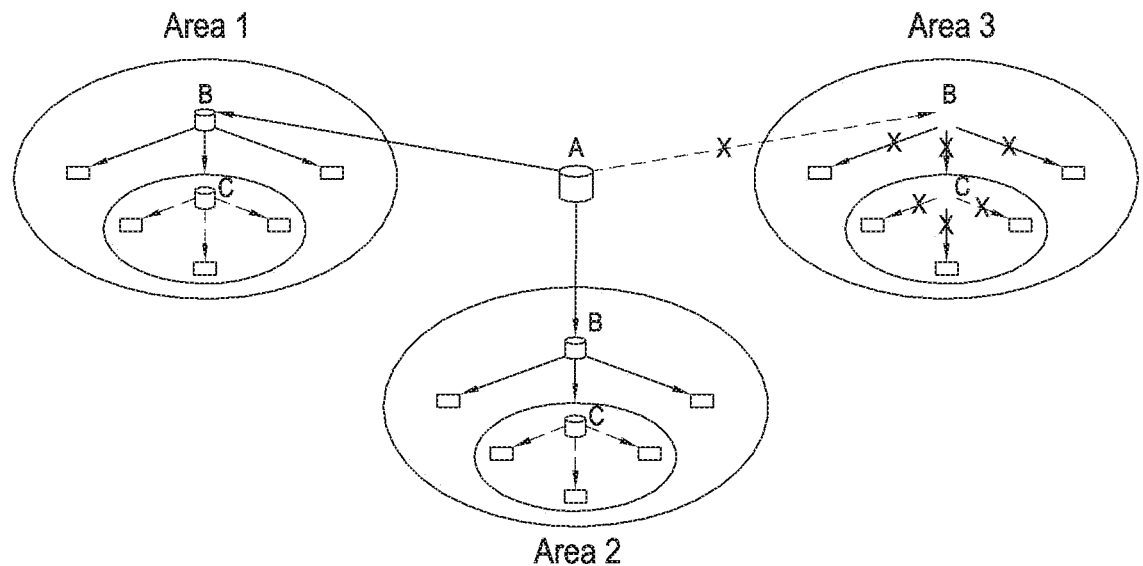
FIG. 1 illustrates a logical structure of a media package according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an mp3 player, a mobile medical device, a camera, a wearable device (e.g., a head-mounted device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a digital video disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, each of a transmitting apparatus and a receiving apparatus may be, for example, a user terminal. The term "user terminal" may be interchangeable with the terms client, user device, user equipment (UE), terminal, device, wireless device, mobile device, mobile station (MS), and/or the like.

In various embodiments of the present disclosure, a receiving apparatus may be, for example, an apparatus for receiving media contents and media signaling information. In various embodiments of the present disclosure, a receiving apparatus may be, for example, an MMT receiving entity.

In various embodiments of the present disclosure, a transmitting apparatus may be, for example, an apparatus for transmitting media contents and media signaling information. In various embodiments of the present disclosure, a transmitting apparatus may be, for example, an MMT transmitting entity.

According to various embodiments of the present disclosure, each of a transmitting apparatus and a receiving apparatus may be, for example, a media source, and the media source may be, for example, a media contents server for providing media contents.

According to various embodiments of the present disclosure, each of a transmitting apparatus and a receiving apparatus may be, for example, a media signaling information server for providing media signaling information.

In various embodiments of the present disclosure, a service may be, for example, a media contents service, and it will be assumed that a server for providing media contents is, for example, a media contents server, and a server for providing media signaling information related to the media contents is, for example, a media signaling information server. In various embodiments of the present disclosure, the media contents service may include a media contents streaming service.

In various embodiments of the present disclosure, contents may include, for example, media contents.

An embodiment of the present disclosure proposes an apparatus and method for transmitting/receiving information related to media contents in a multimedia system.

An embodiment of the present disclosure proposes an apparatus and method for managing a media resource based on the situation of a media contents service in a multimedia system.

An embodiment of the present disclosure proposes an apparatus and method for dynamically transmitting/receiving media resource identification information and media signaling information in a multimedia system.

An embodiment of the present disclosure proposes an apparatus and method for dynamically providing media resource identification information based on the number of user terminals to which a media contents service is provided, use environments of the user terminals, locations of the user terminals, and/or the like in an existing static media resource-allocation environment by using a media contents streaming service that is based on a moving picture experts group (MPEG) media transport (MMT) scheme.

An embodiment of the present disclosure proposes an apparatus and method for providing effective media resource management by providing resource information and signaling information of media contents according to the situation of a media contents service, for example, the number of user terminals to which the media contents service is provided and/or the like, when a real-time media contents service is provided in a multimedia system.

Existing over the top (OTT) service providers or communication providers have tried to decrease network traffic by installing a contents delivery network (CDN) server or a contents server within a communication provider network.

Further, existing mobile broadcasting has been operated in a manner such that a media contents server exists and user terminals access the media contents server. Use of mobile data increases during the process of accessing the media contents server, and a case in which many user terminals access the media contents server at the same time may occur as a result. Therefore, service providers or communication providers separately equip an origin server for managing original data and a server different from the origin server, e.g., an edge server, in order to prevent a decrease in data rate resulting from many user terminals accessing the media contents server at the same time; thereby user terminals may receive required media contents from the edge server. Here, the number of edge servers may be one or more than one, and it is important to manage the mobile data traffic load such as overload, delay of access speed, and/or the like for each edge server. An embodiment of the present disclosure proposes an apparatus and method for transmitting/receiving compound multimedia data in a compound network including various networks such as broadcasting networks, communication networks, and/or the like, and more particularly, to an apparatus and method for transmitting/receiving compound multimedia data based on an MMT scheme.

An apparatus and method proposed in an embodiment of the present disclosure may be applied to various communication systems such as a digital video broadcasting system, for example, a mobile broadcasting service such as a digital multimedia broadcasting (DMB) service, a digital video broadcasting-handheld (DVP-H) service, an advanced television systems committee-mobile/handheld (ATSC-M/H) service, and the like, and an internet protocol television (IPTV) service, a moving picture experts group (MPEG) media transport (MMT) system, an evolved packet system (EPS), a long term evolution (LTE) mobile communication system, an LTE-advanced (LTE-A) mobile communication system, a high speed downlink packet access (HSDPA) mobile communication system, a high speed uplink packet access (HSDPA) mobile communication system, a high rate packet data (HRPD) mobile communication system proposed in a $3^{rd}$ generation partnership project 2 (3GPP2), a wideband code division multiple access (WCDMA) mobile communication system proposed in the 3GPP2, a code division multiple access (CDMA) mobile communication system proposed in the 3GPP2, an institute of electrical and electronics engineers (IEEE) mobile communication system, a mobile internet protocol (Mobile IP) system, and/or the like.

In a media contents streaming service based on an MMT scheme, media signaling information related to MMT media contents provided by a contents provider, e.g., MMT general location info, and/or the like and media resource allocation information provided by a contents provider or a service provider, e.g., valid time, a transmission access type, and/or the like are provided, so a media contents streaming service based on dynamic resource identification information is provided when a user terminal uses a media contents service.

In a general CDN environment, in order to use a media contents service, a user terminal accesses a server managed by a service provider for providing the media contents service that the user terminal wants, and obtains the address of a CDN server which provides the media contents service that the user terminal wants. The user terminal obtains, from a CDN management server for managing CDN information, the address of a media contents server suitable for the reception environment of the user terminal, e.g., the location of the user terminal, and/or the like based on the obtained address of the CDN server. A media contents service is provided to the user terminal from the media contents server based on the address of the media contents server obtained from the CDN management server.

In this way, a CDN is a technology for relatively quickly and stably transmitting large-capacity media contents online, and a technology by which main internet service providers (ISPs) distribute media contents to CDN servers in order to make a user terminal receive media contents from the CDN server that is closest to the user terminal on a network path; thereby traffic is not concentrated on a specific server, e.g., an origin media contents server which manages original media contents and is distributed to a plurality of CDN servers.

In an embodiment of the present disclosure, media signaling information and media resource allocation information, which are based on an MMT scheme given to a user terminal in a CDN environment, are provided based on the network state and network situation of the user terminal, thereby it is possible to effectively provide a media contents service.

At this time, in an embodiment of the present disclosure, a process of obtaining CDN server information, which a user terminal has performed with a service provider server, and a process of obtaining a media contents server address, which the user terminal has performed with a CDN management server for obtaining the address of a media contents server for providing a media contents service which the user terminal wants in a general CDN environment, are performed with a distributed resource identification (DRI) server, not the service provider server or the CDN management server. Here, the DRI server denotes a server which receives a media contents service provided by a service provider in real time, requests information related to the media contents service from a CDN management server, receives the address of a contents server from which each media contents service is provided from the CDN management server and stores the address of the contents server in the form of a received message, and provides a user terminal with media resource allocation information for corresponding media contents through a DRI message. The DRI server obtains the address of a server for providing media signaling information for the corresponding media contents to provide the user terminal with corresponding media signaling information through a distributed signaling information (DSI) message.

For example, a user terminal using a media contents service receives a DRI message and a DSI message provided by a media contents server or a service provider upon service access. The user terminal determines whether a DRI message and a DSI message, which have been already received, are updated by checking the message version of the DRI message and the DSI message. At this time, the DRI message includes media resource allocation information of media contents which a DRI server receives by communicating with a CDN server and a service user server, and the DSI message includes media signaling information of the media contents.

Thereafter, the user terminal receives through, for example, a DSI message, media signaling information related to MMT media contents received from the media contents server or the service provider.

The user terminal receives, through a DRI message, media resource allocation information provided by the media contents server or the service provider, requests media contents that the user terminal wants from a corresponding media contents server based on the media resource allocation information, and receives the media contents that the user terminal wants from the corresponding media contents server.

In various embodiments of the present disclosure, a contents provider or a service provider allocates a priority to the address of each of a media signaling server and a media contents server that a user terminal may access based on information of the user terminal, the network situation of the user terminal, and/or the like, and transmits, to the user terminal, information related to the priority through a DRI message and a DSI message.

The format of a DRI message proposed in an embodiment of the present disclosure will be described with reference to Table 1.

TABLE 1

| Syntax | Value | No. of bits | Mnemonic |
|---|---|---|---|
| DRI_message ( ) { | | | |
|     message_id | | 16 | uimsbf |
|     version | | 8 | uimsbf |
|     Length | | 16 | uimsbf |
|     message_payload{ | | | |
|         MMT_package_id { | | | |
|             MMT_package_id_length | N1 | 8 | uimsbf |
|             for (i=0; i<N1; i++) { | | | |
|                 MMT_package_id_byte | | 8 | uimsbf |
|             } | | | |
|         } | | | |
|         number of assets | N2 | 8 | uimsbf |
|         for (i=0; i<N2; i++) { | | | |
|             asset_id( ) | | | |
|             packet_id | | | |
|             priority_type | | 2 | uimsbf |
|             Reserved | | 6 | uimsbf |
|             valid_time_start | | 64 | uimsbf |
|             valid_time_duration | | 64 | uimsbf |
|             if(priority_type == 00){ | | | |
|                 primary_media_source_location{ | | | |
|                     MMT_general_location_info( ) | | | |
|                     delivery_type ( ) | | | |
|                 } | | | |
|             } | | | |
|             elseif(priority_type == 01){ | | | |
|                 alternative_media_source_location{ | | | |
|                     number of alternative | N3 | 8 | uimsbf |
|                       for(i=0; N3; i++) { | | | |
| alternative_media_source_id | | 8 | uimsbf |
| MMT_general_location_info( ) | | | |
|                     delivery_type ( ) | | | |
|                 } | | | |
|             } | | | |
|             elseif(priority_type == 10){ | | | |
|                 origin_media_source_location { | | | |
|                     MMT_general_location_info( ) | | | |
|                     delivery_type ( ) | | | |
|                 } | | | |
|             } | | | |
|         } | | | |
|     } | | | |
| } | | | |

In Table 1, a message_id field is a field indicating a DRI message ID, and the message_id field may be implemented with, for example, 16 bits.

In Table 1, a version field indicates versions of DRI messages. A receiving apparatus, e.g., an MMT receiving entity, may check whether a received DRI message is new based on the version field. The version field may be implemented with, for example, 8 bits.

In Table 1, a length field indicates the length of the DRI messages. The length of the length field may be implemented with, for example, 16 bits. The length field indicates the length of a DRI message, which is counted in bytes, from a field immediately following the DRI message to the last byte. Here, "0" from among the field values of the length field will not be used.

In Table 1, an MMT_package_id field indicates a unique identifier of a package which is serviced. Here, a package may be, for example, a package used in an MMT scheme, and indicates, for example, logical collection of media data.

In Table 1, an MMT_package_id_length field indicates the length of an MMT_package_id string in bytes except for a terminating null character.

In Table 1, an MMT_package_id_byte field indicates one byte of MMT_package_id. If the MMT_package_id_byte is a string, the terminating null character is not included in the string.

In Table 1, number_of_assets indicates the number of assets of which information is provided by an MMT package (MP) table. Here, an asset may be an asset used in an MMT scheme.

In Table 1, an asset_id field indicates the asset ID of another asset which a dependent asset associated with the asset_id depends on, and this may be expressed as shown in Table 2. An order of IDs provided in the asset_id field makes the concatenation of media processing units (MPUs) result in an effective MPU and follow a media dependency hierarchy. Here, an MPU is the same as the definition in an MMT scheme, and a detailed description will be omitted herein.

TABLE 2

| Syntax | Value | No. of bits | Mnemonic |
|---|---|---|---|
| asset_id( ){ | | | |
|     asset_id_scheme | | 32 | uimsbf |
|     asset_id_length | N | 8 | uimsbf |
|     for (j=0; j<N; j++) { | | | |
|         asset_id_byte | | 8 | uimsbf |
|     } | | | |
| } | | | |

In Table 2, an asset_id_scheme field provides an asset ID scheme, and the asset ID scheme identifies the scheme of an asset ID used in asset_id_value including an identifier of an asset, and is shown in Table 3.

In Table 2, an asset_id_length field provides the length of asset_id, and an asset_id_byte field indicates one byte of asset_id.

TABLE 3

| Value | Description |
|---|---|
| "UUID" | UUID (universally unique identifier) |
| "URI" | URI (uniform resource identifier) |

In Table 1, a packet_id field indicates an identifier of an MMT protocol (MMTP) session included in an MMTP packet header.

In Table 1, a priority_type field indicates a priority of a media source location indicator. The priority_type field may be set to one of four values as expressed in Table 2. If the field value of the priority_type field is set to "00", a receiving apparatus, e.g., an MMT receiving entity may receive a data unit, e.g., an asset from a primary media source location.

Meanwhile, four values which may be set in the priority_type field may be expressed as Table 4.

TABLE 4

| Value | Description |
|---|---|
| '00' | Primary media source location |
| '01' | Alternative media source location |
| '10' | Origin media source location |
| '11' | Reserved |

As shown in Table 4, the priority_type field may be implemented with, for example, 2 bits. If the value of the priority_type field is set to, for example, "00", it means that the receiving apparatus may receive a data unit, e.g., an asset at a primary media source location, if the value of the priority_type field is set to "01", it means that the receiving apparatus may receive a data unit, e.g., an asset at an alternative media source location, and if the value of the priority_type field is set to "10", it means that the receiving apparatus may receive a data unit, e.g., an asset at an origin media source location.

Here, an origin media source location denotes the location of a media contents server which provides or stores origin media contents, and a primary media source location and an alternative media source location are different from the origin media source location. A media contents server which corresponds to the origin media source location may exist within a CDN environment or outside the CDN environment.

The primary media source location indicates the location of a media contents server that may provide a service suitable for a receiving apparatus, for example, in a CDN environment. For example, the primary media source location indicates the location of a media contents server that may provide media contents at the highest data rate at the location closest to the receiving apparatus. The alternative media source location indicates the location of a media contents server from which a media contents service may be received instead of a media contents server which corresponds to the primary media source location if it is impossible to receive the media contents service from the media contents server which corresponds to the primary media source location.

Further, "00" from among the the field values of the priority_type field indicates that it is reserved for future use.

In Table 1, a valid_time_start field indicates network time protocol (NTP) coordinated universal time (UTC) which corresponds to a transmission session valid start time.

In Table 1, a valid_time_duration field indicates UTC of an NTP format which corresponds to a transmission session valid stop time.

In Table 1, a primary_media_source_location field provides a media source location from which a receiving apparatus, e.g., an MMT receiving entity may obtain a data unit, e.g., an asset at a primary media source location, and information of a delivery type.

In Table 1, an alternative_media_source_location field provides a media source location from which a receiving apparatus, e.g., an MMT receiving entity, may obtain a data unit, e.g., an asset at an alternative media source location, and information of a delivery type.

In Table 1, a Number_of_alternative field provides the number of the alternative media source location information for an asset. If the field value of the Number_of_alternative field is set to "1", a data unit, e.g., an asset is delivered through one location. If bulk delivery in which MPUs included in an asset are delivered through a plurality of channels is made, the field value of the Number_of_alternative field is not set to "1".

In Table 1, alternative_media_source_id indicates a unique identifier of an alternative media source.

In Table 1, an origin_media_source_location field provides the media source location from which a receiving apparatus, e.g., an MMT receiving entity may obtain a data unit, e.g., an asset at an origin media source location, and information of a delivery type.

In Table 1, an MMT_general_location_info field provides location information of a data unit, e.g., an asset. The location information provided in the MMT_general_location_info field is identical to location information of an asset provided in an MMT scheme, and may be expressed as Tables 5 and 6. Here, field values of a location_type field between '0x00' and '0x06' will be used for an asset location.

TABLE 5

| Syntax | Value | No. of bits | Mnemonic |
|---|---|---|---|
| MMT_general _location_info( ) { | | | |
|   location_type | | 8 | uimsbf |
|   if (location_type == 0x00) { | | | |
|     packet_ id | | 16 | uimsbf |
|   } else if (location_type == 0x01) { | | | |
|     ipv4_src_addr | | 32 | uimsbf |
|     ipv4_dst_addr | | 32 | uimsbf |
|     dst_port | | 16 | uimsbf |
|     packet_ id | | 16 | uimsbf |
|   } else if (location_type == 0x02) { | | | |
|     ipv6_src_addr | | 128 | uimsbf |
|     ipv6_dst_addr | | 128 | uimsbf |
|     dst_port | | 16 | uimsbf |
|     packet_ id | | 16 | uimsbf |
|   } else if (location_type == 0x03) { | | | |
|     network_id | | 16 | uimsbf |
|     MPEG_2_transport_stream_id | | 16 | uimsbf |
|     reserved | '111' | 3 | bslbf |
|     MPEG_2_PID | | 13 | uimsbf |
|   } else if ( location_type == 0x04) { | | | |
|     ipv6_src_addr | | 128 | uimbsf |
|     ipv6_dst_addr | | 128 | uimbsf |

TABLE 5-continued

| Syntax | Value | No. of bits | Mnemonic |
|---|---|---|---|
|     dst_port | | 16 | uimsbf |
|     reserved | '111' | 3 | bslbf |
|     MPEG_2_PID | | 13 | uimsbf |
| } else if (location_type == '0x05') { | | | |
|     URL_length | N1 | 8 | uimsbf |
|     for (i=0; i<N1; i++) { | | | |
|         URL_byte | | 8 | char |
|     } | | | |
| } else if (location_type =='0x06') { | | | |
|     length | N2 | 16 | uimsbf |
|     for (i=0;i<N2;i++) { | | | |
|         byte | | 8 | uimsbf |
|     } | | | |
| } else if (location_type == '0x07') { | | | |
| } else if (location_type == '0x08') { | | | |
|     message_id | | 8 | uimsbf |
| } else if (location_type == '0x09') { | | | |
|     packet_id | | 16 | uimsbf |
|     message_id | | 8 | uimsbf |
| } else if (location_type == '0x0A') { | | | |
|     ipv4_src_addr | | 32 | uimsbf |
|     ipv4_dst_addr | | 32 | uimsbf |
|     dst_port | | 16 | uimsbf |
|     packet_id | | 16 | uimsbf |
|     message_id | | 8 | uimsbf |

TABLE 6

| | Value | No. of bits | Mnemonic |
|---|---|---|---|
| } else if (location_type == '0x0B') { | | 128 | uimsbf |
|     ipv6_src_addr | | 128 | uimsbf |
|     ipv6_dst_addr | | 16 | uimsbf |
|     dst_port | | 16 | uimsbf |
|     packet_id | | 8 | uimsbf |
|     message_id | | | |
| } else if(location_type == '0x0C') { | | 32 | uimsbf |
|     ipv4_src_addr | | 32 | uimsbf |
|     ipv4_dst_addr | | 16 | uimsbf |
|     dst_port | '111' | 3 | bslbf |
|     reserved | | 13 | uimsbf |
|     MPEG_2_PID | | | |
| } | | | |
| } | | | |

In Tables 5 and 6, a location type field indicates a type of location information as expressed in Table 7.

TABLE 7

| Value | Discription |
|---|---|
| 0x00 | An Asset in the same MMTP packet flow as the one than carries the data structure to which this MMT_general_location_info( ) belongs |
| 0x01 | MMTP packet flow over UDP/IP (version 4) |
| 0x02 | MMTP packet flow over UDP/IP (version 6) |
| 0x03 | A program within an MPEG-2 TS in a broadcast network. The program is indicated by a PMT PID is described in ISO/IEC 13818-1 |
| 0x04 | An elementary stream (ES) in ab MPEG-2 TS over the IP broadcast network |
| 0x05 | URL |
| 0x06 | reserved for private location information |
| 0x07 | The same signalling message as the one that carries the data structure to which this MMT_general_location_info( ) belongs |
| 0x08 | A signalling message delivered in the same data path as the one that carries the data structure to which this MMT_general_location_info( ) belongs |
| 0x09 | A signalling message delivered in a data path in the same UDP/IP flow as the one that carries the data structure to which this MMT_general_location_info( ) belongs |
| 0x0A | A signalling message delivered in a data path in a UDP/IP (version 4) flow |
| 0x0B | A signalling message delivered in a data path in a UDP/IP (version 6) flow |
| 0x0C | An elementary stream (ES) in an MPEG-2 TS over the IP v4 broadcast network |
| 0x0D~0x9F | reserved for ISO use |
| 0xA0~0xFF | reserved for private use |

In Table 7, a packet_id field indicates a packet_id included in an MMTP packet header, an ipv4_src_addr field indicates an IP version 4 source address of an IP application data flow, an ipv4_dst_addr field indicates an IP version 4 destination address of an IP application data flow, a dst_port field indicates a destination port number of an IP application data flow, an ipv6_src_addr field indicates IP version 6 source address of an IP application data flow, an ipv6_dst_addr field indicates IP version 6 destination address of an IP application data flow, a network_id field indicates a broadcast network identifier for delivering an MPEG-2 TS (herein, the network_id field is specific to use in a broadcast system), an MPEG_2_transport_stream_id field indicates an MPEG-2 transport stream (TS) identifier, an MPEG 2 PID field indicates a packet identifier (PID) of an MPEG-2 TS packet which delivers an element stream (ES), a URL_length field indicates the length of URL in bytes (herein, terminating null, e.g., "0x00" will not be counted), a URL_byte field indicates one byte of URL (herein, terminating null, e.g., "0x00" will not be included), a byte_offset field indicates a byte offset from the first byte of a file, a length field indicates the length, in bytes, of a byte range, and a message_id field indicates an MMT signaling message identifier.

In Table 1, a transmission_delivery_type field indicates a type of transmission access channel of media content delivery as expressed in Table 8.

TABLE 8

| Value | Description |
|---|---|
| 0001 | Broadcast delivery only |
| 0010 | Unicast delivery only |
| 0011 | Hybrid delivery |
| 0100~1111 | Reserved |

As shown in Table 8, a transmission_delivery_type field may be implemented with, for example, 4 bits. If a value of the transmission_delivery_type field is, for example, "0001", the type of the transmission access channel indicates Broadcast delivery only, if the value of the transmission_delivery_type field is, for example, "0010", the type of the transmission access channel indicates Unicast delivery only, and if the value of the transmission_delivery_type field is, for example, "0011", the type of the transmission access channel indicates Hybrid delivery.

Further, "0100" to "1111" from among the field values of the transmission_delivery_type field indicate that they are reserved for future use.

Next, the format of a DSI message proposed in an embodiment of the present disclosure will be described with reference to Table 9.

In Table 9, a valid_time_start field indicates UTC time of an NTP format which corresponds to the effective start time of a signaling message transmission session.

In Table 9, a valid_time_duration field indicates UTC time of an NTP format which corresponds to an effective transmission duration of a signaling message transmission session.

In Table 9, an MMT_package_id field indicates a unique identifier of a package which is serviced.

In Table 9, an MMT_package_id_length field indicates the length of an MMT_package_id string in bytes except for a terminating null character.

TABLE 9

| Syntax | Value | No. of bits | Mnemonic |
|---|---|---|---|
| DSI_message ( ) { | | | |
|     message_id | | 16 | uimsbf |
|     version | | 8 | uimsbf |
|     length | | 16 | uimsbf |
|     message_payload{ | | | |
|         MMT_package_id { | | | |
|             MMT_package_id_length | | | |
|             for (i=0; i<N1; i++) { | | | |
|             MMT_package_id_byte | | | |
|             } | | | |
|         } | | | |
|     number of mmt signaling | N1 | 8 | uimsbf |
|     for (i=0; i<N1; i++) { | | | |
|         message_id( ) | | | |
|         priority_type | | 2 | uimsbf |
|         reserved | | 6 | uimsbf |
|         valid_time_start | | 64 | uimsbf |
|         valid_time_duration | | 64 | uimsbf |
|         if(priority_type == 00) { | | | |
|             primary_signaling_location { | | | |
|                 MMT_general_location_info( ) | | | |
|                 delivery_type ( ) | | | |
|         } | | | |
|         elseif(priority_type == 01) { | | | |
|             alternative_signaling_location { | | | |
|                 number of alternative | N2 | 8 | uimsbf |
|                 for(i=0; N2; i++) { | | | |
| alternative_server_id | | 8 | uimsbf |
| MMT_general_location_info( ) | | | |
|                 delivery_type | | 4 | uimsbf |
|             } | | | |
|         elseif(priority_type == 10){ | | | |
|             origin_signaling_location { | | | |
|                 MMT_general_location_info( ) | | | |
|                 access_type( ) | | | |
|             } | | | |
|         } | | | |
|     } | | | |
| } | | | |
| } | | | |

In Table 9, a message_id field is a field indicating a DSI message ID, and the message_id field may be implemented with, for example, 16 bits.

In Table 9, a version field indicates versions of DSI messages. A receiving apparatus, e.g., an MMT receiving entity may check whether a received DSI message is new based on the version field. The version field may be implemented with, for example, 8 bits.

In Table 9, a length field indicates the length of the DSI messages. The length of the length field may be implemented with, for example, 16 bits. The length field indicates the length of a DSI message, which is counted in bytes, from a field immediately following the DSI message to the last byte. Here, "0" from among the field values of the length field will not be used.

In Table 9, an MMT_package_id_byte field indicates one byte of MMT_package_id. If the MMT_package_id_byte is a string, the terminating null character is not included in the string.

In Table 9, the number of mmt signaling provides the number of signaling messages which are referred to by the DSI message.

In Table 9, a priority_type field indicates the priority of a signaling location indicator. The priority_type field may be set to one of four values as expressed in Table 10. If the field value of the priority_type field is set to "00", a receiving apparatus, e.g., an MMT receiving entity may receive signaling information, e.g., a signaling message at a primary media source location.

Meanwhile, four values which may be set in the priority_type field may be expressed as Table 10.

TABLE 10

| Value | Description |
| --- | --- |
| '00' | Primary signaling location |
| '01' | Alternative signaling location |
| '10' | Origin signaling location |
| '11' | Reserved |

As shown in Table 10, the priority_type field may be implemented with, for example, 2 bits. If the value of the priority_type field is set to, for example, "00", it means that the receiving apparatus may receive signaling information, e.g., a signaling message at a primary signaling location, if the value of the priority_type field is set to "01", it means that the receiving apparatus may receive signaling information, e.g., a signaling message at an alternative signaling location, and if the value of the priority_type field is set to "10", it means that the receiving apparatus may receive signaling information, e.g., a signaling message from an origin signaling location.

Here, an origin signaling location denotes the location of a media signaling information server which provides or stores origin signaling information, and a primary signaling location and an alternative signaling location are different from the origin signaling location. A signaling information server which corresponds to the origin signaling location may exist within a CDN environment or outside the CDN environment.

Further, "00" from among the field values of the priority_type field indicates that it is reserved for future use.

In Table 9, a primary_signaling_location field provides signaling message location from which a receiving apparatus, e.g., an MMT receiving entity, may obtain signaling information, e.g., a signaling message at primary_signaling_location, and information of a delivery type.

In Table 9, an alternative_signaling_location field provides the signaling message location from which a receiving apparatus, e.g., an MMT receiving entity may obtain signaling information, e.g., a signaling message at alternative signaling location, and information of a delivery type.

In Table 9, a Number_of_alternative field provides the number of alternative signaling locations.

In Table 9, alternative_server_id indicates unique identifiers of alternative signaling information servers.

In Table 9, an origin_signaling_location field provides the signaling message location from which a receiving apparatus, e.g., an MMT receiving entity, may obtain signaling information, e.g., a signaling message at an origin signaling location, and information of a delivery type.

In Table 9, an MMT_general_location_info and a transmission_delivery_type field have been described with reference to Table 1, and a detailed description thereof will be omitted herein.

A DRI message and a DSI message have been described with reference to Tables 1 to 10, and an example of an operating process of a receiving apparatus in a multimedia system according to an embodiment of the present disclosure will be described with reference to FIG. 3.

Figure 3:
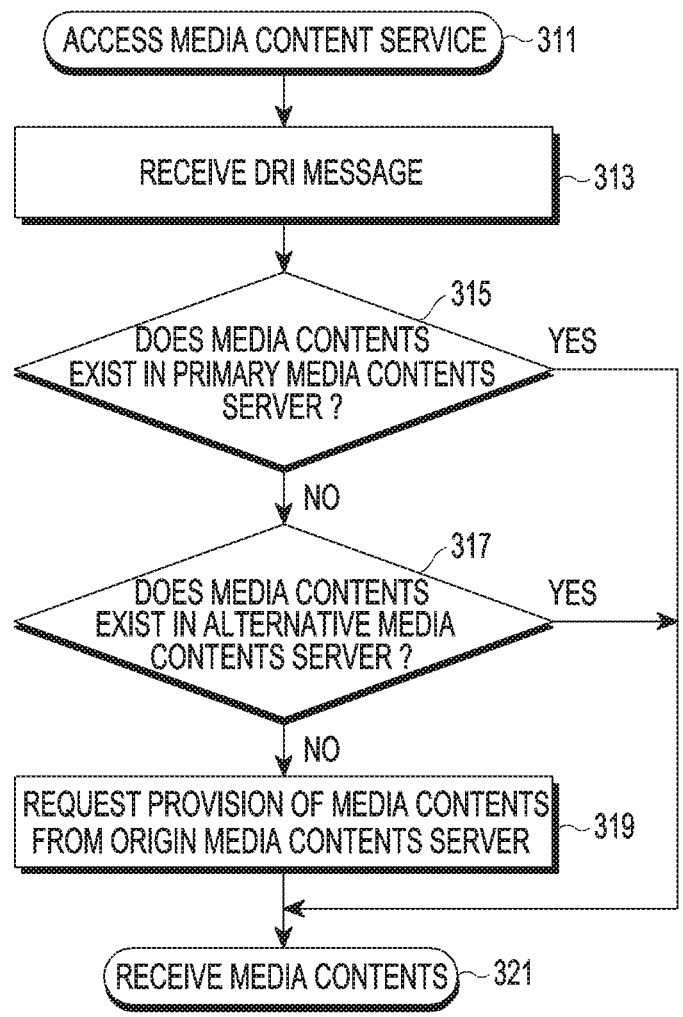
FIG. 3 schematically illustrates an example of an operating process of a receiving apparatus in a multimedia system according to an embodiment of the present disclosure.

FIG. 3 schematically illustrates an example of an operating process of a receiving apparatus in a multimedia system according to an embodiment of the present disclosure.

Referring to FIG. 3, it will be noted that an operating process of a receiving apparatus in FIG. 3 is the operating process of a receiving apparatus in a case in which the field value of a priority_type field included in a DRI message is set to, for example, "00" (priority_type=0). The format of the DRI message has been described with reference to Tables 1 to 8, and a detailed description thereof will be omitted herein.

The receiving apparatus may determine to receive media contents through a media contents server based on a priority_type field included in a DRI message. That is, the receiving apparatus may receive media contents which the receiving apparatus wants to receive from a media contents server which corresponds to a primary_media_location field if the field value of the priority_type field is "00", receive the media contents which the receiving apparatus wants to receive from a media contents server which corresponds to an alternative_media_location field if the field value of the priority_type field is "01", and receive the media contents which the receiving apparatus wants to receive from a media contents server which corresponds to an origin_media_location field if the field value of the priority_type field is "10". In an embodiment of the present disclosure, a receiving apparatus may receive media contents from a media contents server which corresponds to one of the remaining field values of a priority_type field even though the receiving apparatus may not receive the media contents from a media contents server which corresponds to the field value of the priority_type field included in a DRI message received in the receiving apparatus.

Referring back to FIG. 3, the receiving apparatus performs an operation of accessing a media contents service in operation 311, and proceeds to operation 313. The receiving apparatus receives a DRI message in operation 313, and proceeds to operation 315. Here, the DRI message may be received from a contents provider, a service provider, or a DRI server.

In FIG. 3, it has been assumed that the field value of a priority_type field included in the DRI message is "00", so the receiving apparatus determines whether media contents which the receiving apparatus wants to receive exist in a media contents server which corresponds to a primary_media_location field included in the DRI message in operation 315. Herein, the media contents server which corresponds to the primary_media_location field will be referred to as "primary media contents server". The receiving apparatus requests to provide the media contents which the receiving apparatus wants to receive from the primary media contents server, and determines that the media contents do not exist at the primary media contents server if the receiving apparatus receives, from the primary media contents server, information indicating that the primary media contents server does not provide the media contents which the receiving apparatus wants to receive, or if the receiving apparatus does not receive, from the primary media contents server, a response to the request within preset time. Herein, a case in which the receiving apparatus does not receive, from the primary media contents server, a response to the request within the preset time may be a case in which the primary media contents server does not normally operate.

If the media contents which the receiving apparatus wants to receive exist in the primary media contents server in operation 315, the receiving apparatus proceeds to operation 321. The receiving apparatus receives the media contents from a corresponding media contents server, i.e., the primary media contents server in operation 321.

If the media contents which the receiving apparatus wants to receive do not exist in the primary media contents server in operation 315, the receiving apparatus updates the field value of the priority_type field to, for example, "01", and proceeds to operation 317. The receiving apparatus determines whether the media contents which the receiving apparatus wants to receive exist in a media contents server which corresponds to an alternative_media_location field in operation 317. Herein, the media contents server which corresponds to the alternative_media_location field will be referred to as "alternative media contents server". The receiving apparatus requests to provide the media contents which the receiving apparatus wants to receive from the alternative media contents server, and determines that the media contents do not exist at the alternative media contents server if the receiving apparatus receives, from the alternative media contents server, information indicating that the alternative media contents server does not provide the media contents which the receiving apparatus wants to receive, or if the receiving apparatus does not receive, from the alternative media contents server, a response to the request within preset time. Herein, a case that the receiving apparatus does not receive, from the alternative media contents server, a response to the request within the preset time may be a case in which the alternative media contents server does not normally operate.

If the media contents which the receiving apparatus wants to receive exist in the alternative media contents server in operation 317, the receiving apparatus proceeds to operation 321. The receiving apparatus receives the media contents from a corresponding media contents server, i.e., the alternative media contents server in operation 321.

If the media contents which the receiving apparatus wants to receive do not exist in the alternative media contents server in operation 317, the receiving apparatus updates the field value of the priority_type field to, for example, "10", and proceeds to operation 319. The receiving apparatus requests to provide the media contents which the receiving apparatus wants to receive from a media contents server which corresponds to an origin_media_location field in operation 319, and proceeds to operation 321. Herein, the media contents server which corresponds to the origin_media_location field will be referred to as "origin media contents server".

The receiving apparatus receives the media contents from a corresponding media contents server, i.e., the origin media contents server in operation 321.

As described in FIG. 3, the priority of media contents resource allocation information provided through a DRI message in a multimedia system may be provided by a contents provider or a service provider based on the location of a user terminal, network state information, and/or the like by using a DRI server. Herein, the priority of the media contents resource allocation information denotes media resource allocation information indicating that a DRI server, based on information of a contents provider or a service provider, designates a server that may provide a user terminal with optimal media contents, e.g., media contents with the highest data rate, as a media contents server, e.g., a primary media contents server, which corresponds to a primary_media_location field, and designates a server that may provide the user terminal with optimal media contents except for the media contents provided by the primary media contents server, e.g., media contents with a data rate, e.g., a data rate less than the data rate of the media contents provided by the primary media contents server as a media contents server, e.g., an alternative media contents server, which corresponds to an alternative_media_location field.

In a multimedia system according to an embodiment of the present disclosure, a user terminal may receive media contents which the user terminal wants to receive from a media contents server which corresponds to an origin_media_location field included in a DRI message, i.e., an origin media contents server, even though the user terminal may not receive the media contents through the media contents server which corresponds to the primary_media_location field and the media contents server which corresponds to the alternative_media_location field.

Although FIG. 3 illustrates an example of an operating process of a receiving apparatus in a multimedia system according to an embodiment of the present disclosure, and various changes could be made to FIG. 3. For example, although shown as a series of operations, various operations in FIG. 3 could overlap, occur in parallel, occur in a different order, or occur multiple times.

An example of an operating process of a receiving apparatus in a multimedia system according to an embodiment of the present disclosure has been described with reference to FIG. 3, and another example of an operating process of a receiving apparatus in a multimedia system according to an embodiment of the present disclosure will be described with reference to FIG. 4.

Figure 4:
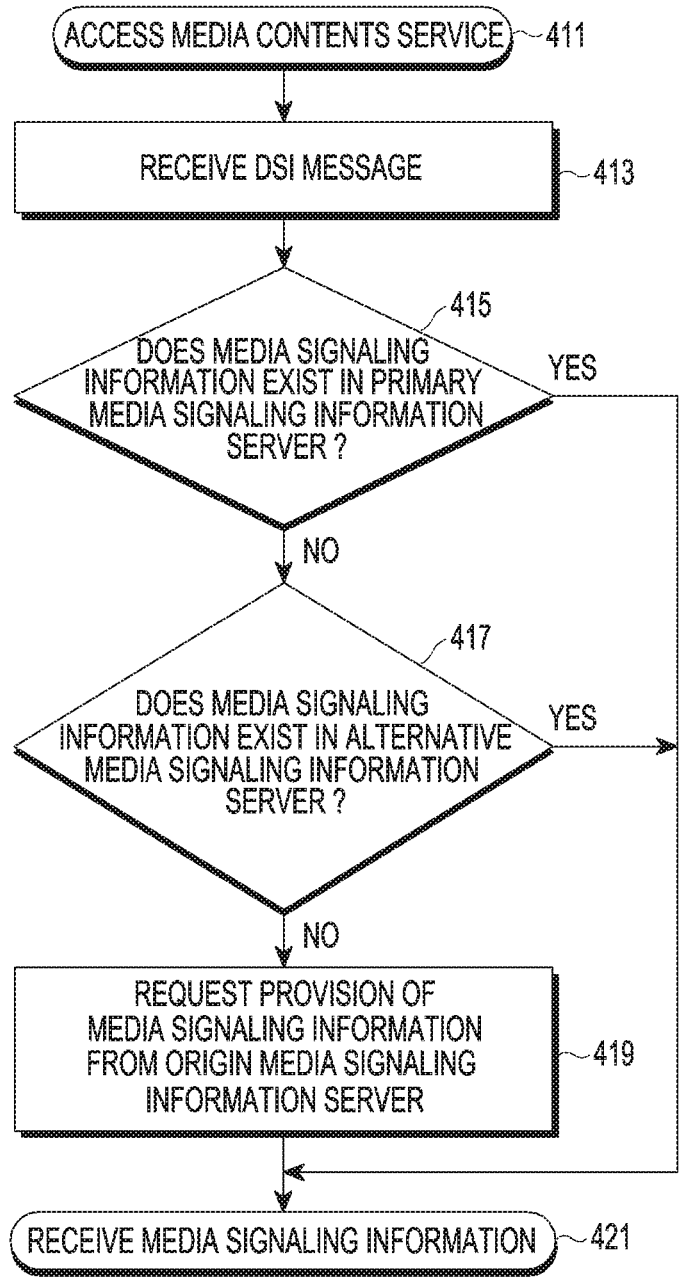
FIG. 4 schematically illustrates another example of an operating process of a receiving apparatus in a multimedia system according to an embodiment of the present disclosure.

FIG. 4 schematically illustrates another example of an operating process of a receiving apparatus in a multimedia system according to an embodiment of the present disclosure.

Referring to FIG. 4, it will be noted that an operating process of a receiving apparatus in FIG. 4 is the operating process of a receiving apparatus in a case in which the field value of a priority_type field included in a DSI message is set to, for example, "00" (priority_type=0). The format of the DSI message has been described with reference to Tables 9 and 10, and a detailed description thereof will be omitted herein.

The receiving apparatus may determine to receive media signaling information through which media signaling information server based on a priority_type field included in a DSI message. That is, the receiving apparatus may receive the media signaling information from a media signaling information server which corresponds to a primary_signaling_location field if the field value of the priority_type field is "00", receive the media signaling information from a media signaling information server which corresponds to an alternative_signaling_location field if the field value of the priority_type field is "01", and receive the media signaling information from a media signaling information server which corresponds to an origin_signaling_location field if the field value of the priority_type field is "10". In an embodiment of the present disclosure, a receiving apparatus may receive media signaling information from a media signaling information server which corresponds to one of remaining field values of a priority_type field even though the receiving apparatus may not receive the media signaling information from a media signaling information server which corresponds to the field value of the priority_type field included in a DSI message received in the receiving apparatus.

Referring back to FIG. 4, the receiving apparatus performs an operation of accessing a media contents service in operation 411, and proceeds to operation 413. The receiving apparatus receives a DSI message in operation 413, and proceeds to operation 415. Here, the DSI message may be received from a contents provider, a service provider, or a DSI server.

In FIG. 4, it has been assumed that the field value of a priority_type field included in the DSI message is "00", so the receiving apparatus determines whether media signaling information exists in a media signaling information server which corresponds to a primary_signaling_location field included in the DSI message in operation 415. Herein, the media signaling information server which corresponds to the primary_signaling_location field will be referred to as "primary media signaling information server". The receiving apparatus requests to provide the media signaling information from the primary media signaling information server, and determines that the media signaling information does not exist at the primary media signaling information server if the receiving apparatus receives, from the primary media signaling information server, information indicating that the primary media signaling information server does not provide the media signaling information, if the receiving apparatus does not receive, from the primary media signaling information server, a response to the request within preset time, or if a version of media signaling information received from the primary media signaling information server is lower than a version of media signaling information stored at the receiving apparatus. Herein, a case in which the receiving apparatus does not receive, from the primary media signaling information server, a response to the request within the preset time may be a case in which the primary media signaling information server does not normally operate.

If the media signaling information exists in the primary media signaling information server in operation 415, the receiving apparatus proceeds to operation 421. The receiving apparatus receives the media signaling information from a corresponding media signaling information server, i.e., the primary media signaling information server in operation 421.

If the media signaling information does not exist in the primary media signaling information server in operation 415, the receiving apparatus updates the field value of the priority_type field to, for example, "01", and proceeds to operation 417. The receiving apparatus determines whether the media signaling information exists in a media signaling information server which corresponds to an alternative_signaling_location field in operation 417. Herein, the media signaling information server which corresponds to the alternative_signaling_location field will be referred to as "alternative media signaling information server". The receiving apparatus requests to provide the media signaling information from the alternative media signaling information server, and determines that the media signaling information does not exist at the alternative media signaling information server if the receiving apparatus receives, from the alternative media signaling information server, information indicating that the alternative media signaling information server does not provide the media signaling information, if the receiving apparatus does not receive, from the alternative media signaling information server, a response to the request within preset time, or if a version of media signaling information received from the alternative media signaling information server is lower than the version of media signaling information stored at the receiving apparatus. Herein, a case in which the receiving apparatus does not receive, from the alternative media signaling information server, a response to the request within the preset time may be a case in which the alternative media signaling information server does not normally operate.

If the media signaling information exists in the alternative media signaling information server in operation 417, the receiving apparatus proceeds to operation 421. The receiving apparatus receives the media signaling information from a corresponding media signaling information server, i.e., the alternative media signaling information server in operation 421.

If the media signaling information does not exist in the alternative media signaling information server in operation 417, the receiving apparatus updates the field value of the priority_type field to, for example, "10", and proceeds to operation 419. The receiving apparatus requests to provide the media signaling information from a media signaling information server which corresponds to an origin_signaling_location field in operation 419, and proceeds to operation 421. Herein, the media signaling information server which corresponds to the origin_signaling_location field will be referred to as "origin media signaling information server".

The receiving apparatus receives the media signaling information from a corresponding media signaling information server, i.e., the origin media signaling information server in operation 421.

In a multimedia system, according to an embodiment of the present disclosure, a user terminal may receive media signaling information from a media signaling information server which corresponds to an origin_signaling_location field included in a DSI message, i.e., an origin media signaling information server, even though the user terminal may not receive the media signaling information through the media signaling information server which corresponds to the primary_signaling_location field or the media signaling information server which corresponds to the alternative_signaling_location field.

Although FIG. 4 illustrates another example of an operating process of a receiving apparatus in a multimedia system according to an embodiment of the present disclosure, various changes could be made to FIG. 4. For example, although shown as a series of operations, various operations in FIG. 4 could overlap, occur in parallel, occur in a different order, or occur multiple times.

A location in various embodiments of the present disclosure will be described below.

For example, in a CDN service, primary_location denotes the location of a media contents server which exists at the closest location from a user terminal and may provide the user terminal with the smoothest service, e.g., a service with the highest data rate, and alternative location denotes the location of an alternative media contents server from which the user terminal may receive a corresponding service if the user terminal may not receive the corresponding service. Further, origin_location denotes the location of a media contents server which exists within a CDN environment or the location of a contents server managed by a contents provider which exists outside the CDN environment.

Basically, if a contents provider or a service provider does not designate the field value of a priority_type field, the field value of the priority_type field is set to "00".

However, the field value of the priority_type field may be set by a contents provider or a service provider according to service situation, and the location of a media contents server that may smoothly provide a corresponding media contents service may be set as the field value of the priority_type field. If the field value of the priority_type field is changed, a user terminal requests media contents and media signaling information from a corresponding media contents server and a corresponding media signaling information server corresponding to the field value of the priority_type field, and receives the media contents and the media signaling information from the corresponding media contents server and the corresponding media signaling information server.

In various embodiments of the present disclosure, a media contents server and a media signaling information server may be implemented with separate devices, or may be implemented with one device.

In an embodiment of the present disclosure, determination of whether it is possible to receive media contents or media signaling information from the location set by a contents provider or a service provider, i.e., determination of whether the media contents or the media signaling information exists in a media contents server or media signaling information server at the location designated by the field value of a priority_type, may be performed (1) by a general CDN server based on a hyper text transfer protocol (HTTP) Request/Response message, and (2) by a server which supports media contents and media signaling information which are based on an MMT scheme based on a Request/Response message within an MMT signaling message. For example, in the case of an HTTP scheme, if an HTTP Response message is not received within a time which corresponds to timeout information included in an HTTP Request message, or if a message indicating that use of a service is impossible, such as an HTTP Response message in which an HTTP response status code is set to request Fail, and/or the like, is received, it is determined that media contents and media signaling information do not exist in a corresponding media contents server and a corresponding media signaling information server; that is, it is determined that the media contents and the media signaling information may not be received from the corresponding media contents server and the corresponding media signaling information server.

Herein, various operating processes performed in a multimedia system according to an embodiment of the present disclosure will be described below.

First, an operating process in a case in which information that a user terminal wants, i.e., media contents that the user terminal wants, does not exist in a media contents server will be described below.

If a user terminal accesses a media contents service and uses the media contents service, the user terminal requests media resource allocation information and media signaling information from a DRI server. The DRI server receives information related to a media contents service provided by a service provider, i.e., media contents service information in real time, requests required information from a CDN management server, and receives the addresses of a media contents server and a media signaling information server that provide media resource allocation information and media signaling information. The DRI server provides the user terminal with media resource allocation information and media signaling information of corresponding media contents through a DRI message and a DSI message based on the addresses of the media contents server and the media signaling information server that provide the media resource allocation information and the media signaling information. Therefore, the user terminal may receive the media resource allocation information and the media signaling information through the DRI message and the DSI message in order to use a service.

An example of a process of providing media contents in a multimedia communication system according to an embodiment of the present disclosure will be described with reference to FIG. 5.

Figure 5:
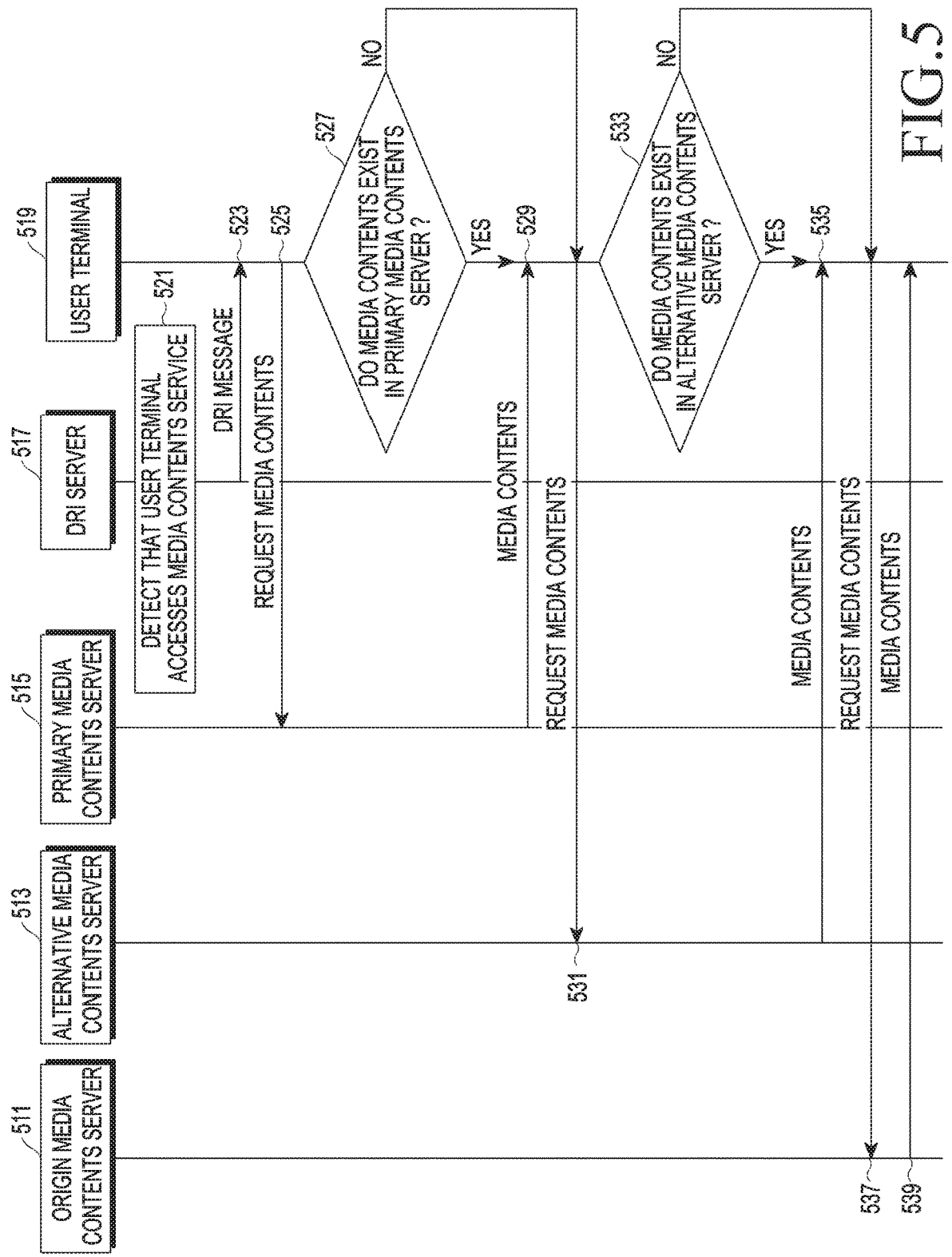
FIG. 5 schematically illustrates an example of a process of providing media contents in a multimedia communication system according to an embodiment of the present disclosure.

FIG. 5 schematically illustrates an example of a process of providing media contents in a multimedia communication system according to an embodiment of the present disclosure.

Referring to FIG. 5, it will be noted that an example of a process of providing media contents in FIG. 5 is a process of providing media contents which corresponds to an operating process of a receiving apparatus as described in FIG. 3.

The multimedia communication system includes an origin media contents server 511, an alternative media contents server 513, a primary media contents server 515, a DRI server 517, and a user terminal 519. Here, the user terminal 519 is a receiving apparatus for receiving media contents. In an embodiment of the present disclosure, it will be assumed that the number of alternative media contents servers is one; however, the number of alternative media contents servers may be two or more than two.

Upon detecting that the user terminal 519 accesses a media contents service (in operation 521), the DRI server 517 transmits a DRI message to the user terminal 519 (in operation 523). Here, the DRI message has been described with reference to Tables 1 to 8, and a detailed description thereof will be omitted herein.

Upon receiving the DRI message from the DRI server 517, the user terminal 519 transmits a message for requesting media contents to a media contents server which corresponds to the field value of a priority_type field included in the DRI message (in operation 525). The process of providing the media contents in FIG. 5 is a process of providing media contents that correspond to the operating process of the receiving apparatus as described in FIG. 3, so the field value of the priority_type field included in the DRI message is set to "00", and the user terminal 519 transmits the message for requesting the media contents to the primary media contents server 515.

The user terminal 519 determines whether there are media contents at the primary media contents server 515 (in operation 527). An operation of determining whether there are media contents at the primary media contents server 515 has been described with reference to FIG. 3, and a detailed description thereof will be omitted herein.

If there are media contents at the primary media contents server 515, the user terminal 519 receives the media contents from the primary media contents server 515 (in operation 529). If there are no media contents at the primary media contents server 515, the user terminal 519 transmits the message for requesting the media contents to the alternative media contents server 513 (in operation 531).

The user terminal 519 determines whether there are media contents at the alternative media contents server 513 (in operation 533). An operation of determining whether there are media contents at the alternative media contents server 513 has been described with reference to FIG. 3, and a detailed description thereof will be omitted herein.

If there are media contents at the alternative media contents server 513, the user terminal 519 receives the media contents from the alternative media contents server 513 (in operation 535). If there are no media contents at the alternative media contents server 513, the user terminal 519 transmits the message for requesting the media contents to the origin media contents server 511 (in operation 537). The user terminal 519 receives the media contents from the origin media contents server 511 (in operation 539).

As described in FIG. 5, a user terminal requests media contents from a media contents server by using media resource allocation information. At this time, priorities for accessing the media resource allocation information and media signaling information are determined according to the situation of a service provider and a network. A DRI server transmits, to a user terminal through the DRI message, media resource allocation information used for receiving media contents, and the priority of the media resource allocation information may be set to one of primary_media_source_location, alternative_media_source_location, and origin_media_source_location.

Yet another example of an operating process of a receiving apparatus in a multimedia system according to an embodiment of the present disclosure will be described with reference to FIG. 6.

Figure 6:
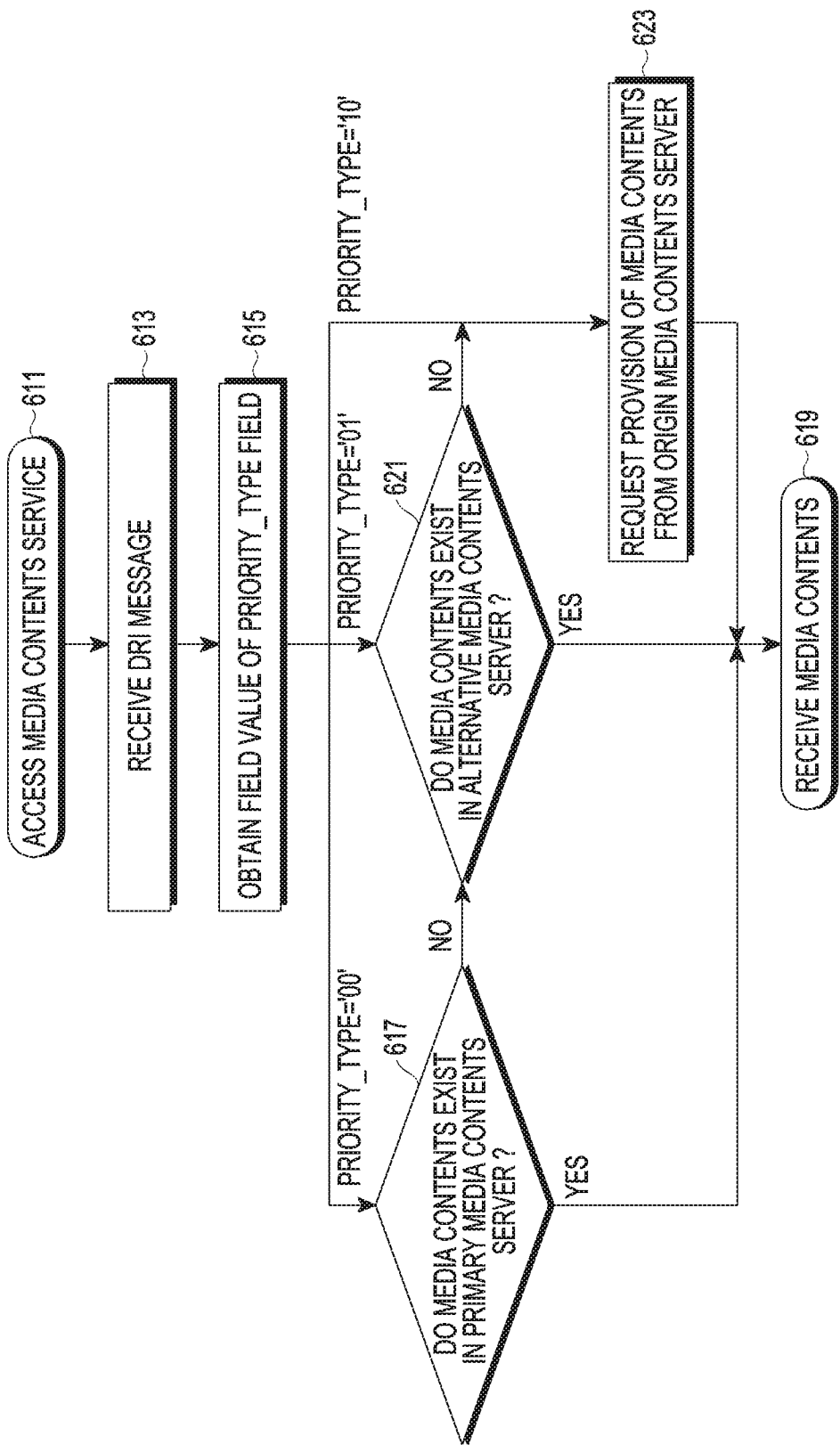
FIG. 6 schematically illustrates yet another example of an operating process of a receiving apparatus in a multimedia system according to an embodiment of the present disclosure.

FIG. 6 schematically illustrates yet another example of an operating process of a receiving apparatus in a multimedia system according to an embodiment of the present disclosure.

Referring to FIG. 6, the receiving apparatus performs an operation of accessing a media contents service in operation 611, and proceeds to operation 613. The receiving apparatus receives a DRI message in operation 613, and proceeds to operation 615. Here, the DRI message may be received from a contents provider, a service provider, or a DRI server. The format of the DRI message has been described with reference to Tables 1 to 8, and a detailed description will be omitted herein.

The receiving apparatus obtains the field value of a priority_type field included in the DRI message in operation 615, and proceeds to operation 617 if the field value of the priority_type field is set to "00". The receiving apparatus determines whether there are media contents in a media contents server which corresponds to the field value of the priority_type field, i.e., a primary media contents server in operation 617. Information related to the primary media contents server is included in a primary_media_source_location field, and the primary_media_source_location field has been described with reference to Tables 1 to 8, and a detailed description will be omitted herein. Further, an operation of determining whether there are media contents in the primary media contents server has been described with reference to FIG. 3, and a detailed description will be omitted herein.

If there are media contents in the primary media contents server in operation 617, the receiving apparatus proceeds to operation 619. The receiving apparatus receives the media contents from the primary media contents server in operation 619.

If there are no media contents in the primary media contents server in operation 617, the receiving apparatus updates the field value of the priority_type field to "01", and proceeds to operation 621. The receiving apparatus determines whether there are media contents in a media contents server which corresponds to the field value of the priority_type field, i.e., an alternative media contents server in operation 621. Information related to the alternative media contents server is included in an alternative_media_source_location field, and the alternative_media_source_location field has been described with reference to Tables 1 to 8, and a detailed description will be omitted herein. Further, an operation of determining whether there are media contents in the alternative media contents server has been described with reference to FIG. 3, and a detailed description will be omitted herein.

If there are media contents in the alternative media contents server in operation 621, the receiving apparatus proceeds to operation 619. The receiving apparatus receives the media contents from the alternative media contents server at operation 619.

If there are no media contents in the alternative media contents server in operation 621, the receiving apparatus updates the field value of the priority_type field to "10", and proceeds to operation 623. The receiving apparatus requests the media contents from a media contents server which corresponds to the field value of the priority_type field, i.e., an origin media contents server in operation 623, and proceeds to operation 619. Information related to the origin media contents server is included in an origin_media_source_location field, and the origin_media_source_location field has been described with reference to Tables 1 to 8, and a detailed description will be omitted herein. The receiving apparatus receives the media contents from the origin media contents server in operation 619.

If an alternative media contents server which corresponds to an alternative_media_source_location field provides media contents for which a media service is identical to the media service, and of which the form, e.g., resolution, a coder/decoder (CODEC), and/or the like is different from the form of the media service while the user terminal receives media contents from a primary media contents server which corresponds to a primary_media_source_location field, the user terminal may request other media contents for the media service, i.e., media contents provided by the alternative media contents server, from an origin media contents server which corresponds to an origin_media_source_location field, and receive the media contents provided by the alternative media contents server from the origin media contents server.

Although FIG. 6 illustrates yet another example of an operating process of a receiving apparatus in a multimedia system according to an embodiment of the present disclosure, various changes could be made to FIG. 6. For example, although shown as a series of operations, various operations in FIG. 6 could overlap, occur in parallel, occur in a different order, or occur multiple times.

Yet another example of an operating process of a receiving apparatus in a multimedia system according to an embodiment of the present disclosure has been described with reference to FIG. 6, and an example of a process of providing media signaling information in a multimedia communication system according to an embodiment of the present disclosure will be described with reference to FIG. 7.

Figure 7:
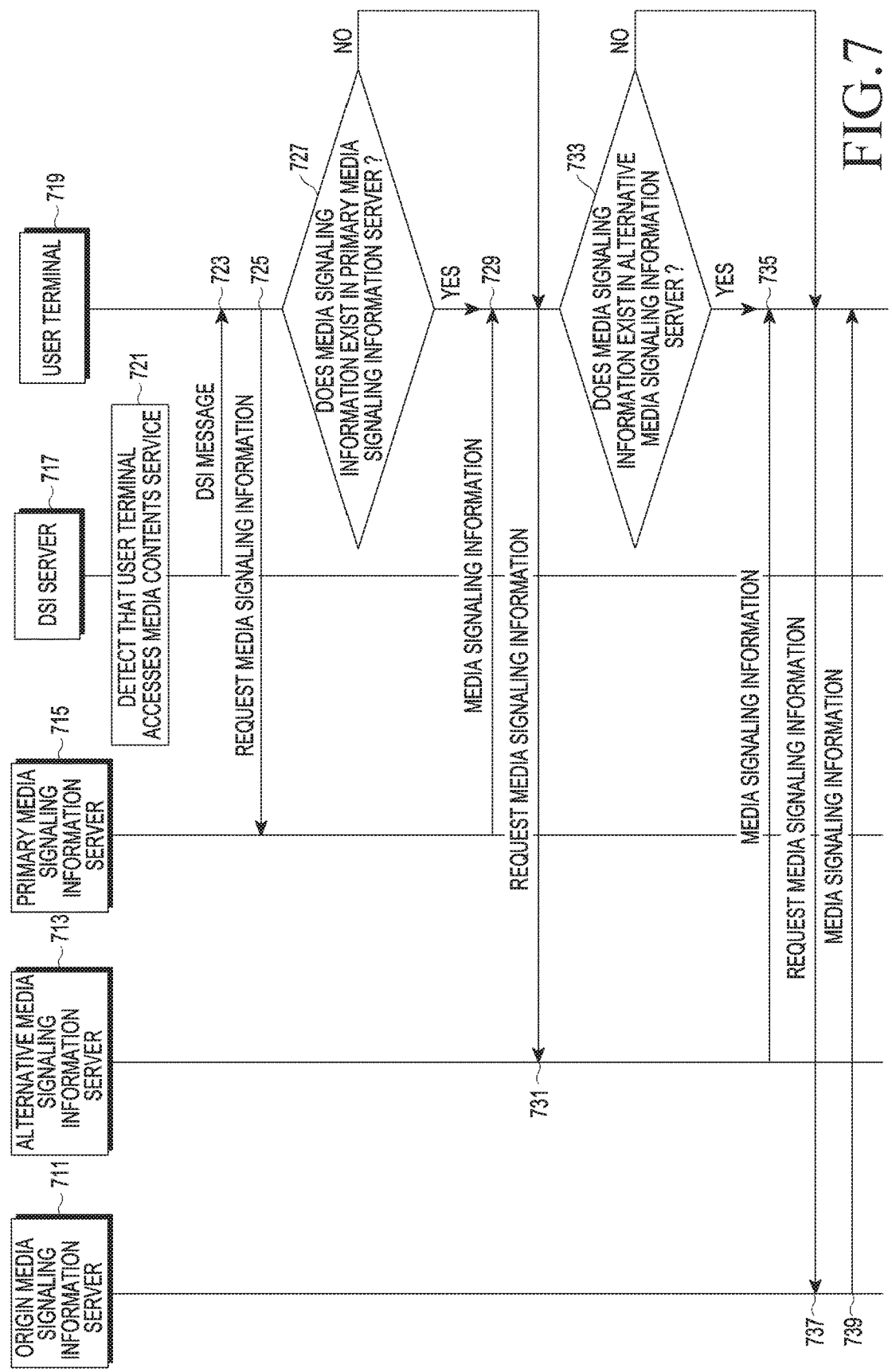
FIG. 7 schematically illustrates an example of a process of providing media signaling information in a multimedia communication system according to an embodiment of the present disclosure.

FIG. 7 schematically illustrates an example of a process of providing media signaling information in a multimedia communication system according to an embodiment of the present disclosure.

Referring to FIG. 7, it will be noted that an example of a process of providing media signaling information in FIG. 7 is a process of providing media signaling information which corresponds to an operating process of a receiving apparatus as described in FIG. 4.

The multimedia communication system includes an origin media signaling information server 711, an alternative media signaling information server 713, a primary media signaling information server 715, a DSI server 717, and a user terminal 719. Here, the user terminal 719 is a receiving apparatus for receiving media signaling information. In an embodiment of the present disclosure, it will be assumed that the number of alternative media signaling information servers is one, however, the number of alternative media signaling information servers may be two or more than two.

Upon detecting that the user terminal 719 accesses a media contents service (in operation 721), the DSI server 717 transmits a DSI message to the user terminal 719 (in operation 723). Here, the DSI message has been described with reference to Tables 9 and 10, and a detailed description thereof will be omitted herein.

Upon receiving the DSI message from the DSI server 717, the user terminal 719 transmits a message for requesting media signaling information to a media signaling information server which corresponds to the field value of a priority_type field included in the DSI message (in operation 725). The process of providing the media signaling information in FIG. 7 is a process of providing media signaling information which corresponds to an operating process of the receiving apparatus as described in FIG. 4, so the field value of the priority_type field included in the DSI message is set to "00", and the user terminal 719 transmits the message for requesting the media signaling information to the primary media signaling information server 715.

The user terminal 719 determines whether there is media signaling information at the primary media signaling information server 715 (in operation 727). An operation of determining whether there is media signaling information at the primary media signaling information server 715 has been described with reference to FIG. 4, and a detailed description thereof will be omitted herein.

If there is media signaling information at the primary media signaling information server 715, the user terminal 719 receives the media signaling information from the primary media signaling information server 715 (in operation 729). If there is no media signaling information at the primary media signaling information server 715, the user terminal 719 transmits the message for requesting the media signaling information to the alternative media signaling information server 713 (in operation 731).

The user terminal 719 determines whether there is media signaling information at the alternative media signaling information server 713 (in operation 733). An operation of determining whether there is media signaling information at the alternative media signaling information server 713 has been described with reference to FIG. 4, and a detailed description thereof will be omitted herein.

If there is media signaling information at the alternative media signaling information server 713, the user terminal 719 receives the media signaling information from the alternative media signaling information server 713 (in operation 735). If there is no media signaling information at the alternative media signaling information server 713, the user terminal 719 transmits the message for requesting the media signaling information to the origin media signaling information server 711 (in operation 737). The user terminal 719 receives the media signaling information from the origin media signaling information server 711 (in operation 739).

Meanwhile, to use a media service, a user terminal needs to receive media signaling information as well as media resource allocation information, and the media signaling information may be transmitted to the user terminal through a DSI message. The priority for accessing information included in the DSI message, e.g., the field value of a priority_type field may be preset according to the situation of a server of a service provider and a network, and the situation of a user terminal; and the user terminal which uses media contents or a media contents service requests media signaling information corresponding to the field value of the priority_type field.

Yet another example of an operating process of a receiving apparatus in a multimedia system according to an embodiment of the present disclosure will be described with reference to FIG. 8.

Figure 8:
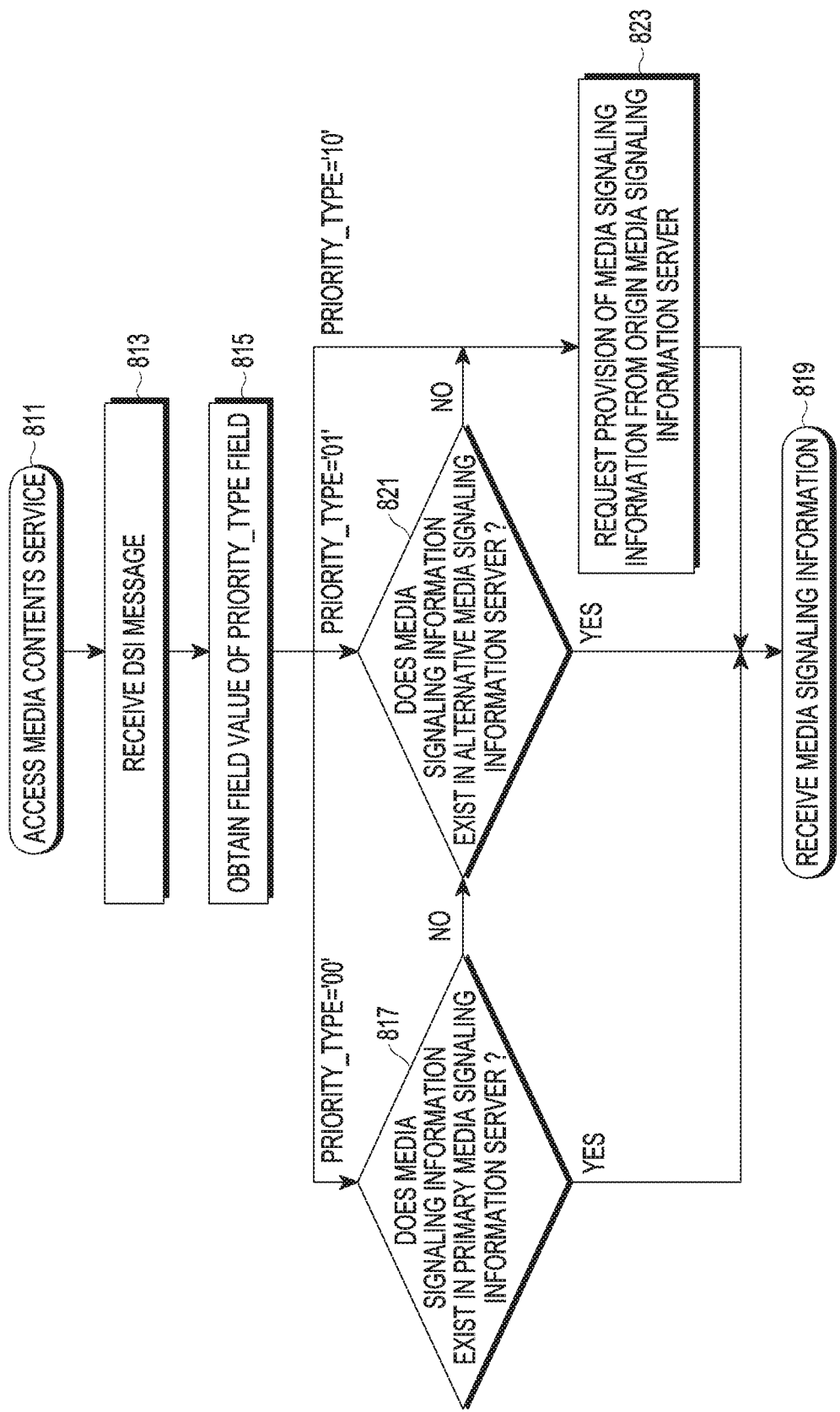
FIG. 8 schematically illustrates yet another example of an operating process of a receiving apparatus in a multimedia system according to an embodiment of the present disclosure.

FIG. 8 schematically illustrates yet another example of an operating process of a receiving apparatus in a multimedia system according to an embodiment of the present disclosure.

Referring to FIG. 8, the receiving apparatus performs an operation of accessing a media contents service in operation 811, and proceeds to operation 813. The receiving apparatus receives a DSI message in operation 813, and proceeds to operation 815. Here, the DSI message may be received from a contents provider, a service provider, or a DSI server. The format of the DSI message has been described with reference to Tables 9 and 10, and a detailed description will be omitted herein.

The receiving apparatus obtains the field value of a priority_type field included in the DSI message in operation 815, and proceeds to operation 817 if the field value of the priority_type field is set to "00". The receiving apparatus determines whether there is media signaling information in a media signaling information server which corresponds to the field value of the priority_type field, i.e., a primary media signaling information server in operation 817. Information related to the primary media signaling information server is included in a primary_signaling_location field, and because the primary_signaling_location field has been described with reference to Tables 9 and 10, a detailed description will be omitted herein. Further, an operation of determining whether there is media signaling information in the primary media signaling information server has been described with reference to FIG. 4, and a detailed description will be omitted herein.

If there is media signaling information in the primary media signaling information server in operation 817, the receiving apparatus proceeds to operation 819. The receiving apparatus receives the media signaling information from the primary media signaling information server at operation 819.

If there is no media signaling information in the primary media signaling information server at operation 817, the receiving apparatus updates the field value of the priority_type field to "01", and proceeds to operation 821. The receiving apparatus determines whether there is media signaling information in a media signaling information server which corresponds to the field value of the priority_type field, i.e., an alternative media signaling information server at operation 821. Information related to the alternative media signaling information server is included in an alternative signlaing location field, and the alternative signlaing location field has been described with reference to Tables 9 and 10, and a detailed description will be omitted herein. Further, an operation of determining whether there is media signaling information in the alternative media signaling information server has been described with reference to FIG. 4, and a detailed description will be omitted herein.

If there is media signaling information in the alternative media signaling information server at operation 821, the receiving apparatus proceeds to operation 819. The receiving apparatus receives the media signaling information from the alternative media signaling information server at operation 819.

If there is no media signaling information in the alternative media signaling information server at operation 821, the receiving apparatus updates the field value of the priority_type field to "10", and proceeds to operation 823. The receiving apparatus requests the media signaling information from a media signaling information server which corresponds to the field value of the priority_type field, i.e., an origin media signaling information server at operation 823, and proceeds to operation 819. Information related to the origin media signaling information server is included in an origin_signaling_location field, and because the origin_signaling_location field has been described with reference to Tables 9 and 10, a detailed description will be omitted herein. The receiving apparatus receives the media signaling information from the origin media signaling information server at operation 819.

Although FIG. 8 illustrates yet another example of an operating process of a receiving apparatus in a multimedia system according to an embodiment of the present disclosure, various changes could be made to FIG. 8. For example, although shown as a series of operations, various operations in FIG. 8 could overlap, occur in parallel, occur in a different order, or occur multiple times.

Second, an operating process in a case in which a media contents service is provided through heterogeneous networks will be described below.

A user terminal may receive media contents serviced through heterogeneous networks according to the network situation and environment of the user terminal when using a media contents service provided by a contents provider or a service provider. In this case, the user terminal may receive the media contents service provided by the heterogeneous networks by using media resource allocation information and media signaling information within a DRI message provided by a DRI server and a DSI message provided by a DSI server.

For example, in a case in which information about primary servers within the DSI message and the DRI message, i.e., a primary media contents server and a primary media signaling information server is set to information about a server of a service provider, and information about alternative servers within the DSI message and the DRI message, i.e., an alternative media contents server and an alternative media signaling information server is set to information about a server of a contents provider, the server of the contents provider may exist within a network of the service provider or outside the network of the service provider.

An inner structure of a multimedia system according to an embodiment of the present disclosure will be described with reference to FIG. 2.

Figure 2:
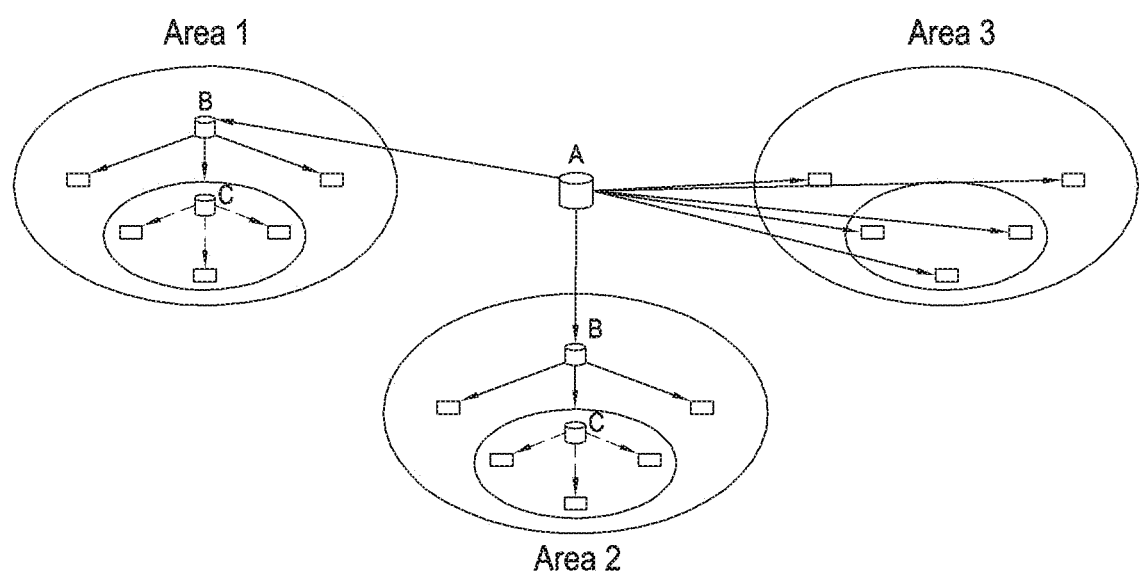
FIG. 2 schematically illustrates an inner structure of a multimedia system according to an embodiment of the present disclosure.

FIG. 2 schematically illustrates an inner structure of a multimedia system according to an embodiment of the present disclosure.

Referring to FIG. 2, a user terminal accesses a media contents service at an area 3 for the first time, receives information about a media contents service which the user terminal wants to receive through a DRI message and a DSI message, and obtains media resource allocation information and media signaling information based on the received DRI message and the received DSI message. The user terminal uses the media contents service based on the obtained media resource allocation information and media signaling information. In this case, the user terminal may access a media contents server and a media signaling information server which correspond to a primary_media_source_location field and a primary_signaling_location field for receiving media contents in order to use a corresponding media contents service.

However, in a case in which a server of a service provider or a designated network may not provide the corresponding media contents service while the user terminal uses the corresponding media contents service, in an embodiment of the present disclosure, a user terminal may change the field value of a priority_type field included in each of a DRI message and a DSI message, and request corresponding media contents and media signaling information from a media contents server and a media signaling information server by using the media contents server which corresponds to an alternative_media_source_location field, a transmission channel defined in a delivery type field, the media signaling information server which corresponds to an alternative_signaling_location field, and a transmission channel defined in a delivery type field, thereby the user terminal may use a seamless media contents service.

Further, media signaling information which has been transmitted through only heterogeneous networks such as a Wifi network, a broadcasting network, and/or the like is provided to a user terminal through a media signaling information server which corresponds to an alternative_signaling_location field or an origin_signaling_location, so it is possible to provide additional information with which the user terminal may access a media signaling information server of another service provider, and the user terminal may receive a media contents service provided through the heterogeneous networks.

For example, while using a media contents service provided by a communication provider in an LTE environment at area 3 in FIG. 2, a user terminal may request broadcasting channel signaling information from another media signaling information server which has the broadcasting channel signaling information, e.g., a media signaling information server which corresponds to an alternative_signaling_location field or a media signaling information server which corresponds to an origin_signaling_location field in order to use a broadcasting channel provided by another channel, and receive the broadcasting channel signaling information in order to use a corresponding broadcasting service.

Meanwhile, a process of determining whether it is impossible to receive media contents or media signaling information at the location designated by a contents provider or a service provider will be described below.

First, existing CDN servers request and receive contents based on an HTTP scheme. At this time, a user terminal requests corresponding media contents and media signaling information from a designated media contents server and media signaling information server based on information within a DRI/DSI message, and determines that it is impossible to receive the corresponding media contents and media signaling information from the designated media contents server and media signaling information server if an HTTP Response message is not received within a corresponding time using Timeout within an HTTP Request message, or a Fail message from among HTTP Response messages is received. The user terminal changes the field value of a priority_type field, for example, the user terminal updates the field value of the priority_type field, and requests the media contents and the media signaling information from a media contents server and a media signaling information server which correspond to the updated field value of the priority_type field.

If the user terminal requests media contents and media signaling information from a CDN server that may analyze and recognize MMT signaling, the user terminal determines that it is impossible to receive the media contents and the media signaling information from a designated CDN server if an HTTP Response message is not received within a corresponding time using a Timeout message within an MMT Request message, or a Fail message from among MMT Response messages is received, and changes the field value of a priority_type field, for example, the user terminal updates the field value of the priority_type field, and requests the media contents and the media signaling information from a media contents server and a media signaling information server which correspond to the updated field value of the priority_type field.

Third, an operating process in a case in which information about a media contents service is changed while the media contents service is provided will be described below.

First, upon accessing a media contents service to use the media contents service, a user terminal requests media resource allocation information from a DRI server, or receives a DRI message and a DSI message provided by a contents provider or a service provider.

The user terminal receives location information related to a media contents server and a media signaling information server which are related to corresponding media contents by using the DRI message and the DSI message. The user terminal may obtain location information of a corresponding media contents server and media signaling information server based on media resource allocation information and a priority_type field related to the priority for accessing media signaling within the DRI message and the DSI message, and use a media contents service by requesting media contents and media signaling information from the corresponding media contents server and media signaling information server.

If a service provider provides a media contents service by changing a media contents server which provides the media contents service and media contents information, e.g., resolution, a bit rate, and/or the like according to the network situation and environment of a user terminal while the user terminal receives media contents and media signaling information based on a DRI message and a DSI message which have been received already, existing user terminals which have used the media contents service already may not continuously use the media contents service because mismatch between media signaling information and media signaling information received from a new media contents server.

For example, a contents provider and a service provider may determine to temporarily change media contents information, e.g., resolution, and/or the like for a media contents service which is provided to a user terminal because user terminals are concentrated on a service provided by the contents provider and the service provider, or performance of a neighboring network of the user terminal is degraded. In a case in which a user terminal to which a media contents service has been provided with full HD (FHD) level-picture quality in an LTE environment is in a Wifi environment or a bad communication environment in which user terminals temporarily concentrated, a contents provider and a service provider may temporarily provide the user terminal with a media contents service at HD level-picture quality for seamless provision of the media contents service.

For example, in a case in which the network situation and service situation are temporarily changed as described above while an existing user terminal receives media contents and media signaling information provided by a contents provider or a service provider from a media contents server and a media signaling information server which corresponds to a primary_media_location field, the user terminal may seamlessly receive corresponding media contents from a media contents server which corresponds to an alternative_media_source_location field within a DRI message and a DSI message which have been received already, request, from a media signaling information server which corresponds to an alternative_signaling_location field or an origin_signaling_location field according to the field value of a priority_type field included in a DSI message, media signaling information which corresponds to changed information if information of corresponding media contents is changed, and receive the media signaling information from a media signaling information server which corresponds to the alternative_signaling_location field or the origin_signaling_location field to use a seamless service.

Further, a process of determining whether it is impossible to receive media contents or media signaling information at the location designated by a contents provider or a service provider will be described below.

First, existing CDN servers request and receive contents based on an HTTP scheme. At this time, a user terminal requests corresponding media contents and media signaling information from a designated media contents server and media signaling information server based on information within a DRI/DSI message, and determines that it is impossible to receive the corresponding media contents and media signaling information from the designated media contents server and media signaling information server if an HTTP Response message is not received within a corresponding time using a Timeout message within an HTTP Request message, or a Fail message from among HTTP Response messages is received. The user terminal changes the field value of a priority_type field, for example, the user terminal updates the field value of the priority_type field, and requests the media contents and the media signaling information from a media contents server and a media signaling information server which correspond to the updated field value of the priority_type field.

If the user terminal requests media contents and media signaling information from a CDN server that may analyze and recognize MMT signaling, the user terminal determines that it is impossible to receive the media contents and the media signaling information from a designated CDN server if an HTTP Response message is not received within a corresponding time using a Timeout message within an MMT Request message, or a Fail message among MMT Response messages is received, and changes the field value of a priority_type field, for example, the user terminal updates the field value of the priority_type field, and requests the media contents and the media signaling information from a media contents server and a media signaling information server which correspond to the updated field value of the priority_type field.

If media contents information is changed, the user terminal receives media contents by changing the field value of a priority_type field within a DRI message according to whether a corresponding contents resource is used, and uses a media contents service based on existing media signaling information. In a case in which the user terminal may not use a media contents service which is received by using existing media signaling information due to changed media contents information, the user terminal changes and updates the field value of a priority_type field, and receives new media signaling information from a media signaling information server which corresponds to an alternative_signaling_location field or an origin_signaling_location field within an existing DSI message to use a media contents service.

Figure 9:
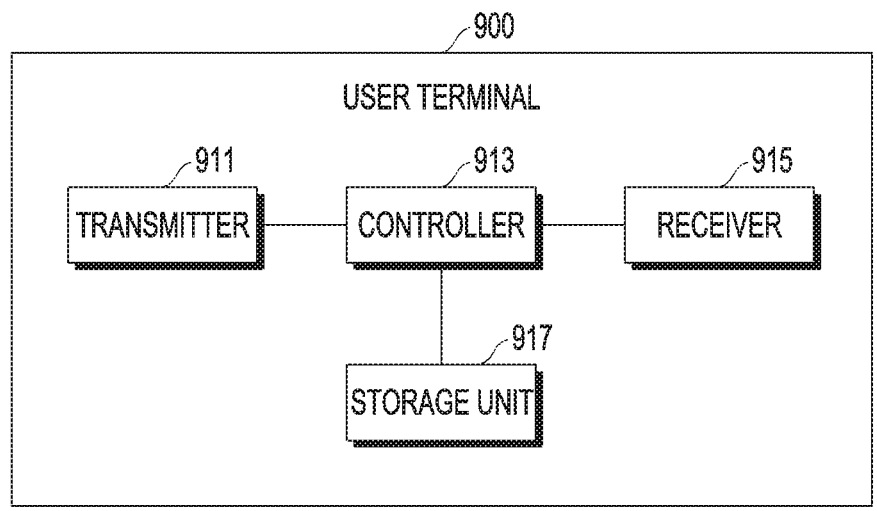
FIG. 9 schematically illustrates an inner structure of a user terminal in a multimedia system according to an embodiment of the present disclosure.

An inner structure of a user terminal in a multimedia system according to an embodiment of the present disclosure will be described with reference to FIG. 9. FIG. 9 schematically illustrates an inner structure of a user terminal in a multimedia system according to an embodiment of the present disclosure.

Referring to FIG. 9, a user terminal 900 includes a transmitter 911, a controller 913, a receiver 915, and a storage unit 917.

The controller 913 controls the overall operation of the user terminal 900, and more particularly, controls an operation related to an operation of transmitting/receiving information related to media contents, e.g., media resource allocation information and media signaling information in a multimedia system according to an embodiment of the present disclosure. The operation related to the operation of transmitting/receiving the information related to the media contents, e.g., the media resource allocation information and the media signaling information in the multimedia system according to an embodiment of the present disclosure has been described with reference to FIGS. 2 to 8, and a detailed description thereof will be omitted herein.

The transmitter 911 transmits various signals and various messages to at least one other device, e.g., a primary media contents sever, an alternative media contents sever, an origin media contents sever, a primary media signaling information server, an alternative media signaling information server, an origin media signaling information server, a DRI server, a DSI server, and/or the like under the control of the controller 913. The various signals and the various messages transmitted by the transmitter 911 have been described in FIGS. 2 to 8, and a detailed description thereof will be omitted herein.

The receiver 915 receives various signals and various messages from at least one other device, e.g., a primary media contents sever, an alternative media contents sever, an origin media contents sever, a primary media signaling information server, an alternative media signaling information server, an origin media signaling information server, a DRI server, a DSI server, and/or the like under the control of the controller 913. The various signals and the various messages received by the receiver 915 have been described in FIGS. 2 to 8, and a detailed description thereof will be omitted herein.

The storage unit 917 stores various programs and various data for the user terminal 900 to perform an operation of transmitting/receiving information related to media contents, e.g., media resource allocation information and media signaling information, and/or the like in a multimedia system, according to an embodiment of the present disclosure as described in FIGS. 2 to 8, and stores data which occurs while the operation of transmitting/receiving the information related to the media contents, e.g., the media resource allocation information and the media signaling information, and/or the like are performed in the multimedia system according to an embodiment of the present disclosure as described in FIGS. 2 to 8.

Although the transmitter 911, the controller 913, the receiver 915, and the storage unit 917 are described as separate units in the user terminal 900 in FIG. 9, it is to be understood that the user terminal 900 may be implemented with a form into which at least two of the transmitter 911, the controller 913, the receiver 915, and the storage unit 917 are incorporated.

Although the transmitter 911, the controller 913, the receiver 915, and the storage unit 917 are described as separate units in the user terminal 900 in FIG. 9, it is to be understood that the user terminal 900 may be implemented with at least one processor.

In an embodiment of the present disclosure, a contents provider and a service provider allocate a dynamic media resource according to the network situation and environment of a service user, thereby it is possible to provide effective network management and a seamless streaming service when a real-time media contents service and a non real-time media contents service are actually provided.

In an embodiment of the present disclosure, a service provider provides the priority for an access of a server for receiving media signaling information, thereby it is possible to effectively provide a service when a media contents service is used and a real-time streaming service is provided between heterogeneous networks.

Although not shown in any FIGS, each of the devices included in the multimedia system according to an embodiment of the present disclosure, e.g., a primary media contents sever, an alternative media contents sever, an origin media contents sever, a primary media signaling information server, an alternative media signaling information server, an origin media signaling information server, a DRI server, a DSI server, and/or the like may include a transmitter, a controller, a receiver, and a storage unit.

The controller controls the overall operation of a corresponding entity, e.g., one of a primary media contents sever, an alternative media contents sever, an origin media contents sever, a primary media signaling information server, an alternative media signaling information server, an origin media signaling information server, a DRI server, a DSI server, and/or the like, and, more particularly controls the corresponding entity to perform an operation related to an operation of transmitting/receiving information related to media contents, e.g., media resource allocation information and media signaling information in a multimedia system according to an embodiment of the present disclosure. The operation related to the operation of transmitting/receiving the information related to the media contents, e.g., the media resource allocation information and the media signaling information in the multimedia system, according to an embodiment of the present disclosure, has been described with reference to FIGS. 2 to 8, and a detailed description thereof will be omitted herein.

The transmitter transmits various signals and various messages to at least one other device that is different from the corresponding entity and is included in the multimedia system under the control of the controller. The various signals and the various messages transmitted by the transmitter have been described in FIGS. 2 to 8, and a detailed description thereof will be omitted herein.

The receiver receives various signals and various messages from at least one other device that is different from the corresponding entity and is included in the multimedia system under the control of the controller. The various signals and the various messages received by the receiver have been described in FIGS. 2 to 8, and a detailed description thereof will be omitted herein.

The storage unit stores various programs and various data for the corresponding entity to perform an operation of transmitting/receiving information related to media contents, e.g., media resource allocation information and media signaling information, and/or the like in a multimedia system, according to an embodiment of the present disclosure as described in FIGS. 2 to 8, and stores data which occurs while the operation of transmitting/receiving the information related to the media contents, e.g., the media resource allocation information and the media signaling information, and/or the like are performed in the multimedia system according to an embodiment of the present disclosure as described in FIGS. 2 to 8.

Although the transmitter, the controller, the receiver, and the storage unit are described as separate units in the corresponding entity, it is to be understood that the corresponding entity may be implemented with a form into which at least two of the transmitter, the controller, the receiver, and the storage unit are incorporated.

Although the transmitter, the controller, the receiver, and the storage unit are described as separate units in the corresponding entity, it is to be understood that the corresponding entity may be implemented with at least one processor.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), CD-ROMs, magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a compact disk (CD), a digital video disc (DVD), a magnetic disk, a magnetic tape, and/or the like). A method and apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method of a server in a multimedia system, comprising:
    transmitting, by the server to a user terminal, a distributed resource identification (DRI) message, wherein the DRI message comprises:
        primary media source location information for obtaining an asset,
        alternative media source location information for obtaining the asset,
        origin media source location information for obtaining the asset, and
        priority type information indicating a priority of media source location information,
    wherein the priority type information is set to a value indicating one of the primary media source location information, the alternative media source location information, and the origin media source location information, and
    wherein the alternative media source location information comprises information indicating a number of one or more alternative media source location for the asset.

2. The method of claim 1,
    wherein the primary media source location information indicates location information of a media source from which the user terminal is capable of obtaining the asset, and
    wherein the primary media source location information includes information indicating a location of the asset, and information indicating a delivery type of the asset.

3. The method of claim 1,
    wherein the alternative media source location information indicates location information of a media source from which the user terminal is capable of obtaining the asset, and
    wherein the alternative media source location information further includes an identifier of an alternative media source corresponding to each of the one or more alternative media source location, information indicating each of the one or more alternative media source location of the asset, and information indicating a delivery type of the asset.

4. The method of claim 1,
    wherein the origin media source location information indicates location information of a media source from which the user terminal is capable of obtaining the asset, and
    wherein the origin media source location information includes information indicating a location of the asset, and information indicating a delivery type of the asset.

5. The method of claim 1, wherein the DRI message further includes an identifier of a package which is serviced.

6. A method of a server in a multimedia system, comprising:
    transmitting, by the server to a user terminal, a distributed signaling information (DSI) message, wherein the DSI message comprises:
        primary signaling location information for obtaining a signaling message,
        alternative signaling location information for obtaining the signaling message,
        origin signaling location information for obtaining the signaling message, and
        priority type information indicating a priority of signaling location information,
    wherein the priority type information is set to a value indicating one of the primary signaling location information, the alternative signaling location information, and the origin signaling location information, and wherein the alternative media source location information comprises information indicating a number of one or more alternative signaling location for the asset.

7. The method of claim 6, wherein the primary signaling location information indicates location information of the signaling message from which the user terminal is capable of obtaining the signaling message, and wherein the primary signaling location information includes information indicating a location of the signaling message, and information indicating a delivery type of the signaling message.

8. The method of claim 6, wherein the alternative signaling location information indicates location information of the signaling message from which the user terminal is capable of obtaining the signaling message, and wherein the alternative signaling location information further includes an identifier of an alternative sending entity of the signaling message corresponding to each of the one or more one or more alternative signaling location, information indicating each of the one or more alternative signaling location of the signaling message, and information indicating a delivery type of the signaling message.

9. The method of claim 6, wherein the origin signaling location information indicates location information of the signaling message from which the user terminal is capable of obtaining the signaling message, and wherein the origin signaling location information includes information indicating a location of the signaling message, and information indicating a delivery type of the signaling message.

10. The method of claim 6, wherein the DSI message further includes an identifier of a package which is serviced.

11. A server in a multimedia system, comprising:

a transmitter configured to transmit, to a user terminal, a distributed resource identification (DRI) message, wherein the DRI message comprises:

primary media source location information for obtaining an asset, alternative media source location information for obtaining the asset, origin media source location information for obtaining the asset, and priority type information indicating a priority of media source location information, wherein the priority type information is set to a value indicating one of the primary media source location information, the alternative media source location information, and the origin media source location information, and wherein the alternative media source location information comprises information indicating a number of one or more alternative media source location for the asset.

12. The server of claim 11, wherein the primary media source location information indicates location information of a media source from which the user terminal is capable of obtaining the asset, and wherein the primary media source location information includes information indicating a location of the asset, and information indicating a delivery type of the asset.

13. The server of claim 11, wherein the alternative media source location information indicates location information of a media source from which the user terminal is capable of obtaining the asset, and wherein the alternative media source location information further includes an identifier of an alternative media source corresponding to each of the one or more alternative media source location, information indicating each of the alternative media source location of the asset, and information indicating a delivery type of the asset.

14. The server of claim 11, wherein the origin media source location information indicates location information of a media source from which the user terminal is capable of obtaining the asset, and wherein the origin media source location information includes information indicating a location of the asset, and information indicating a delivery type of the asset.

* * * * *